US010928915B2

(12) United States Patent
Goslin et al.

(10) Patent No.: US 10,928,915 B2
(45) Date of Patent: Feb. 23, 2021

(54) DISTRIBUTED STORYTELLING ENVIRONMENT

(71) Applicant: Disney Enterprises, Inc., Burbank, CA (US)

(72) Inventors: Michael P. Goslin, Sherman Oaks, CA (US); Katherine M. Bassett, Pasadena, CA (US); Joseph Logan Olson, Eagle Rock, CA (US); Eric C. Haseltine, Silver Spring, MD (US)

(73) Assignee: Disney Enterprises, Inc., Burbank, CA (US)

( * ) Notice: Subject to any disclaimer, the term of this patent is extended or adjusted under 35 U.S.C. 154(b) by 619 days.

(21) Appl. No.: 15/040,378

(22) Filed: Feb. 10, 2016

(65) Prior Publication Data
US 2017/0228026 A1 Aug. 10, 2017

(51) Int. Cl.
G06F 3/01 (2006.01)
G06T 13/80 (2011.01)
G06T 19/00 (2011.01)
A63H 3/28 (2006.01)

(52) U.S. Cl.
CPC ............... G06F 3/017 (2013.01); A63H 3/28 (2013.01); G06T 13/80 (2013.01); G06T 19/006 (2013.01); A63H 2200/00 (2013.01)

(58) Field of Classification Search
CPC .... A63F 9/24; B25J 9/16; G06F 3/017; A63H 3/28; A63H 2200/00; G06T 13/80; G06T 19/006
See application file for complete search history.

(56) References Cited

U.S. PATENT DOCUMENTS

| 9,997,199 | B2* | 6/2018 | Gewickey | H04N 13/344 |
| 2011/0028219 | A1* | 2/2011 | Heatherly | A63H 3/28 |
| | | | | 463/42 |
| 2011/0252437 | A1* | 10/2011 | Smith | H04N 7/002 |
| | | | | 725/1 |
| 2011/0314381 | A1* | 12/2011 | Fuller | A63F 13/47 |
| | | | | 715/727 |
| 2012/0136825 | A1* | 5/2012 | Harris | A63F 13/12 |
| | | | | 707/608 |
| 2012/0157197 | A1* | 6/2012 | Watkins, Jr. | A63F 13/79 |
| | | | | 463/30 |

(Continued)

Primary Examiner — Malina D. Blaise
(74) Attorney, Agent, or Firm — Patterson + Sheridan, LLP

(57) ABSTRACT

A method, computer-readable medium, and system are disclosed for an interactive storytelling environment. The method comprises identifying a plurality of storytelling devices available to participate in a storytelling experience, including a first storytelling device at a first physical location and a second storytelling device at a remote second physical location. The method further comprises receiving, based on user input during playback of a story, an instruction to perform a first action of a predetermined plurality of actions using the second storytelling device, the user input indicating a user interaction with a depiction of the second storytelling device at the first physical location. The method further comprises performing, based on timing information included in the received instruction, the first action using the second storytelling device such that performing the first action is at least partly synchronized with performance of an animation sequence of the depicted second storytelling device.

20 Claims, 12 Drawing Sheets

(56) References Cited

U.S. PATENT DOCUMENTS

| | | | | |
|---|---|---|---|---|
| 2013/0072080 A1* | 3/2013 | Garbos | ............... | A63H 33/38 |
| | | | | 446/26 |
| 2013/0145240 A1* | 6/2013 | Anderson | ............ | G09B 5/062 |
| | | | | 715/201 |
| 2014/0080109 A1* | 3/2014 | Haseltine | ............ | A63F 13/06 |
| | | | | 434/308 |
| 2014/0162785 A1* | 6/2014 | Reiche | ................ | A63F 13/12 |
| | | | | 463/35 |
| 2014/0287779 A1* | 9/2014 | O'Keefe | ............ | H04L 67/18 |
| | | | | 455/456.3 |
| 2014/0364240 A1* | 12/2014 | Leyland | ............. | A63H 3/003 |
| | | | | 463/43 |
| 2015/0026576 A1* | 1/2015 | Elmieh | ................ | G06F 16/74 |
| | | | | 715/720 |
| 2015/0078232 A1* | 3/2015 | Djinki | ................. | H04W 4/80 |
| | | | | 370/311 |
| 2015/0224400 A1* | 8/2015 | Goslin | ................ | A63F 13/65 |
| | | | | 463/24 |
| 2015/0243286 A1* | 8/2015 | Goslin | .................. | A63H 5/00 |
| | | | | 704/500 |
| 2016/0151705 A1* | 6/2016 | Ji | ................... | H04N 21/4223 |
| | | | | 463/29 |
| 2016/0225187 A1* | 8/2016 | Knipp | ................ | G06T 19/006 |
| 2016/0381171 A1* | 12/2016 | Anderson | ............ | H04L 67/22 |
| | | | | 709/217 |
| 2017/0095746 A1* | 4/2017 | Kim | .................... | A63H 5/00 |
| 2019/0273837 A1* | 9/2019 | Townsend | ............ | H04N 1/2108 |

\* cited by examiner

DISTRIBUTED STORYTELLING ENVIRONMENT

BACKGROUND

Field of the Disclosure

The present disclosure generally relates to home entertainment, and more specifically to techniques for providing an immersive playtime environment using interactive devices.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of the disclosure and are therefore not to be considered limiting of its scope, for the disclosure may admit to other equally effective embodiments.

DETAILED DESCRIPTION

Generally, embodiments presented herein provide techniques for creating an immersive storytelling environment using one or more storytelling devices (also referred to as interactive devices). More specifically, embodiments may use various storytelling devices, each capable of producing some auditory and/or visual effects, to create an immersive and interactive storytelling experience for a user. Such a system may include a variety of storytelling devices and a controller, connected via a network (e.g., a radio frequency (RF) communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audio-visual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

Exemplary Storytelling Device Implementations

Figure 1:
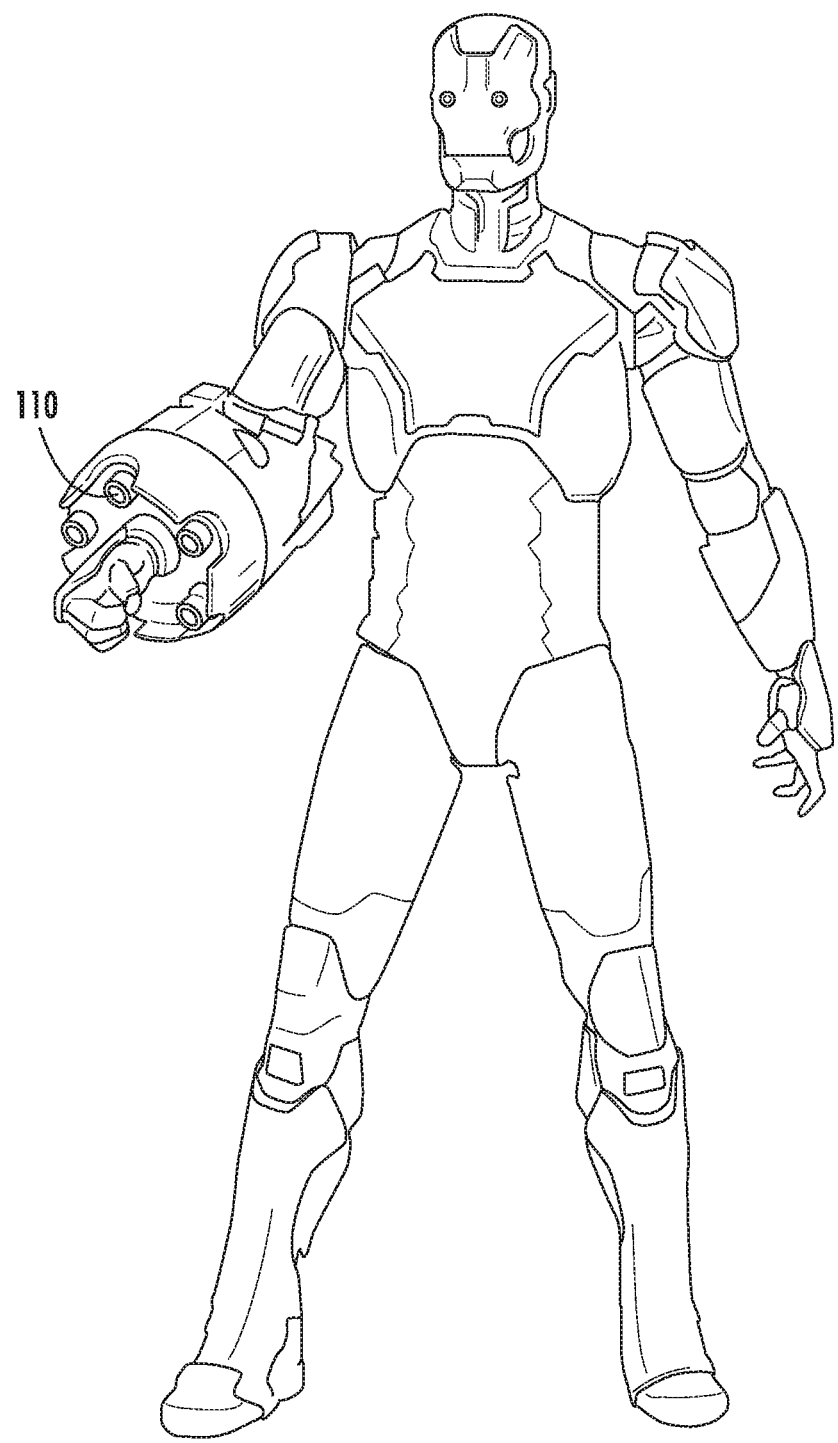
FIG. 1 illustrates a storytelling device, according to one embodiment described herein.

One embodiment provides interactive devices and techniques for providing an immersive play experience for users. For instance, one embodiment provides interactive action figures which are capable of performing actions and reacting to actions performed by other action figures or by a user. An example of such a device is shown in FIG. 1, which depicts an Iron Man® action figure configured to interact within an immersive play environment. For example, the Iron Man® action figure includes an infrared transmitter capable of transmitting coded infrared signals that simulates a blast from Iron Man's "repulsor ray." Generally, the coded infrared signals represent any infrared signals that include a data value(s) identifying the signal as pertaining to one of the interactive devices. In one embodiment, the signal is coded such that it identifies it originated from the Iron Man® type of action figure.

Figure 2:
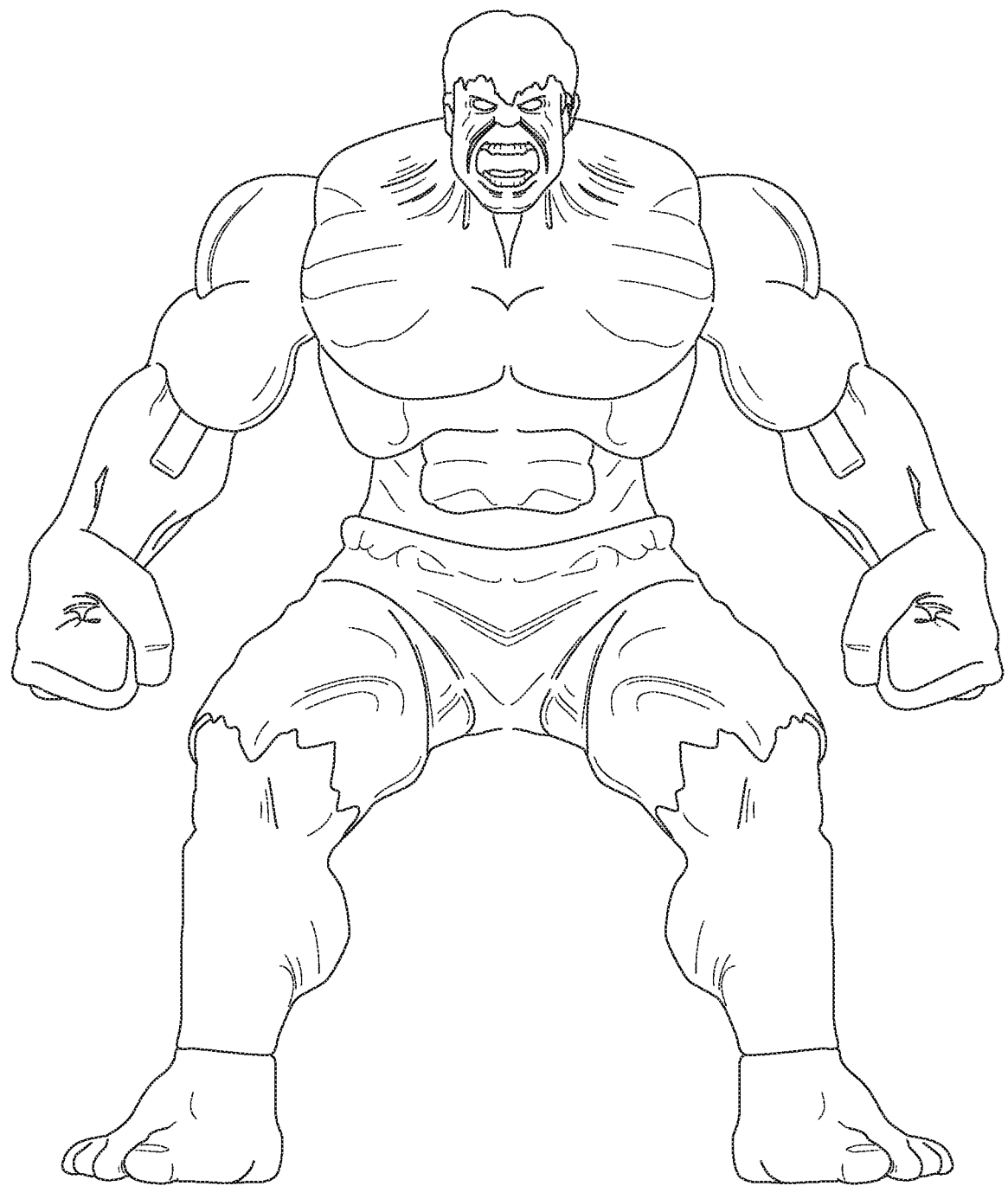
FIG. 2 illustrates a storytelling device, according to one embodiment described herein.

Other devices within the environment may receive these coded infrared signals and may react accordingly. For example, the Hulk® action figure shown in FIG. 2 could include an infrared receiver for detecting the infrared signal. Moreover, logic for the Hulk® action figure could then process the infrared signal and could determine that the signal represents a blast from Iron Man's repulsor ray. The logic could then perform an action in response to receiving the coded infrared signal. For example, the logic could update a state for the Hulk® action figure to indicate that a repulsor ray hit has been received. For instance, the Hulk® action figure could be configured to perform an action after receiving each repulsor ray hit, where the action is determined based on how many hits the action figure has already received. As an example, for the first repulsor ray hit, the Hulk® action figure could be configured to output a prerecorded roaring sound (e.g., using one or more speakers associated with the action figure). Upon receiving a second repulsor ray hit, the Hulk® action figure could be configured to manipulate its arms and head, in addition to outputting a roaring sound. After receiving a third repulsor ray hit, the Hulk® action figure could be configured to rock back and forth, and after receiving a fourth repulsor ray hit, the Hulk® action figure could be configured to fall over (i.e., to topple from an initial standing position) on the table.

Figure 3:
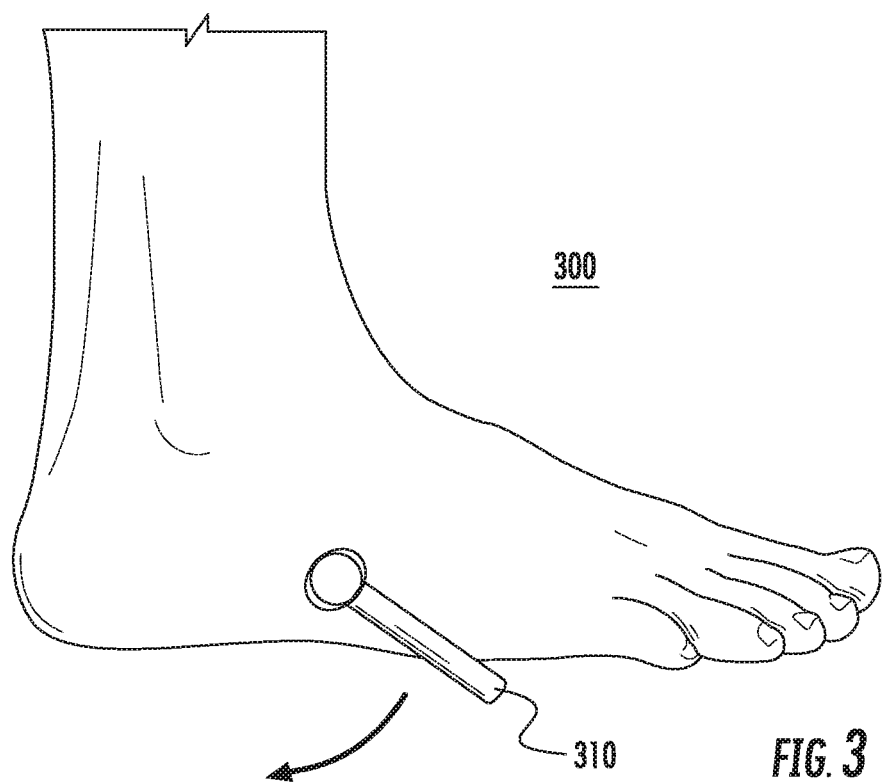
FIG. 3 illustrates a rotatable arm within a storytelling device, according to one embodiment described herein.

An example of such a rocking motion is shown in FIG. 3, which illustrates a foot of an action figure configured to perform a rocking motion. Here, the foot 300 includes a rotating arm 310 which, in its resting position, is even with (or above) the base of the foot. That is, the arm 310 can be positioned such that the foot will sit flat on the surface (e.g., a table top), allowing the action figure (e.g., the Hulk® action figure) to stand in a stationary position on the surface. The arm 310 may be attached to a servomechanism which provides the movement of the arm 310. In this embodiment, the arm 310 may be manipulated to move in the clockwise direction, causing the action figure to shift its position on the surface. The arm's 310 rotation could be controlled to manipulate the action figure's movement. For example, the arm 310 could be rotated in the clockwise direction slightly and then returned to the resting position in order to cause the action figure to rock back and forth on the surface. In one embodiment, rotating arms 310 within each foot of the action figure could alternate slight rotations, in order to cause the action figure to shift from one foot to the other. As another example, the arm 310 could be rotated substantially in the clockwise direction, in order to cause the action figure to fall over onto the surface. Of note, while the above examples relate to Marvel® themed action figures and reacting to incoming blasts from a repulsor ray, such examples are for illustrative purposes only and are without limitation. More generally, the rotating arm 310 could be used to introduce movement into any action figure or device, responsive to the action figure or device entering a certain state (e.g., upon receiving a predefined number of coded infrared signals).

Figure 4:
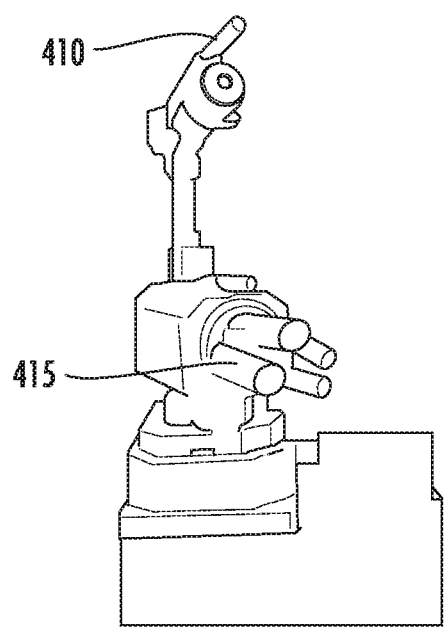
FIG. 4 illustrates a foam dart turret storytelling device, according to one embodiment described herein.

In addition to infrared signals, embodiments may interact with one another using physical projectiles. An example of such an embodiment is shown in FIG. 4, which illustrates a bore-sighted turret configured to fire foam darts. Here, the turret includes a bore-sighted video camera 410 and a number of foam darts 415. In the depicted embodiment, the camera 410 is positioned such that the camera 410 moves in conjunction with the orientation of the foam darts 415, allowing a user to see aim the foam darts 415 at a target. For example, the turret could be controlled using a software application (e.g., executing on a remote computing device), and the software application could output a video stream with a targeting reticule for use in aiming the foam darts 415. The foam darts 415 could be launched using a pneumatic apparatus. For example, each be mounted onto a hollow cylinder and, upon receiving a signal to fire one of the darts 415, the turret could shoot a burst of air into the corresponding cylinder, causing the dart 415 to launch. More generally, however, any device for aiming and launching projectiles may be used in accordance with the techniques described herein.

In one embodiment, the interactive devices are configured to detect and respond to hits from physical projectiles. For instance, the Hulk® action figure could be configured to detect and react to hits from the foam darts 415 (e.g., in a similar fashion to hits from the coded infrared signals representing repulsor ray blasts). For example, the Hulk® action figure could include an accelerometer and could be configured with logic to detect readings from the accelerometer matching a particular signature that corresponds to hits from the foam darts 415. That is, the accelerometer may produce a certain pattern of readings when the Hulk® action figure is struck with one of the foam darts 415, and the Hulk® action figure could be configured to determine that a foam dart has struck the Hulk® action figure upon detecting such a pattern of readings from the accelerometer. Advantageously, doing so allows the Hulk® action figure to react to hits from physical projectiles such as the foam darts 415, and further allows the Hulk® action figure to distinguish between general movements (e.g., a user handling the Hulk® action figure) and strikes from physical projectiles.

For instance, upon detecting accelerometer readings matching the signature of a foam dart strike, logic for the Hulk® action figure could cause the Hulk® action figure to output the roaring sound effect and to vibrate, simulating the action figure shaking with rage. In one embodiment, the vibration effect is achieved using a speaker within the action figure. For example, the speaker could produce a low frequency, high amplitude sound effect that causes the action figure to vibrate. Moreover, the action figure could be balanced such that the vibration causes the action figure to move in a particular way. For example, the Hulk® action figure could have an asymmetrical balance, such that more weight is to the rear of the toy (i.e., the Hulk® action figure's back) than is at the front of the toy (i.e., the Hulk® action figure's chest). When the Hulk® action figure then begins vibrating, the weight differential could cause the Hulk® action figure to move backwards.

For instance, upon detecting a strike from a foam dart, the Hulk® action figure could output a sound effect (e.g., a roaring sound) using a first speaker within the Hulk® action figure, and the Hulk® action figure could then begin vibrating using a second speaker, causing the Hulk® action figure to vibrate and move backwards on the surface (e.g., the table top). In one embodiment, a platform could be provided for the Hulk® action figure, such that when the Hulk® action figure move backwards for a sufficient distance through the use of the speaker, the Hulk® action figure could fall off the platform and fall over onto the surface (e.g., a table surface on which the platform is sitting). For example, the Hulk® action figure could be configured to move backwards a particular amount (i.e., through the use of speaker-induced vibration) responsive to each hit (e.g., detecting a coded infrared signal indicating a blast from Iron Man's® repulsor ray). As the Hulk® action figure moves backwards after each hit, the Hulk® action figure could fall off the platform after a certain number of hits, causing the Hulk® action figure to fall over. Advantageously, doing so provides a low cost way of introducing vibration and movement into a device, and provides a more realistic and immersive play experience as the Hulk® action figure appears to reel backwards and eventually fall over from the impact of foam darts and "repulsor ray" blasts.

Figure 5:
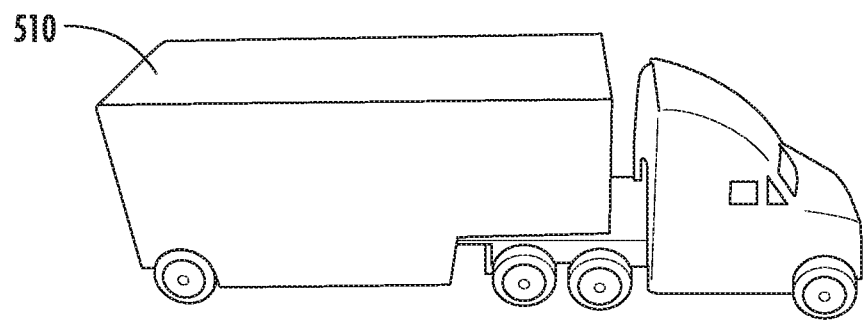
FIG. 5 illustrates an exploding vehicle storytelling device, according to one embodiment described herein.

Another example is shown in FIG. 5, which includes a toy vehicle 510. As shown, the toy vehicle 510 is assembled using a number of spring-loaded pieces, and includes a mechanism for releasing the spring-loaded pieces, causing the toy vehicle 510 to disassemble. For example, logic associated with the toy vehicle 510 could maintain a count of how many hits the toy vehicle 510 has sustained (e.g., hits from foam darts, hits from coded infrared signals, etc.), and upon the count exceeding a predefined threshold of hits, the toy vehicle 510 could trigger the mechanism to release the spring-loaded pieces, causing the toy vehicle 510 to appear to explode in response to the most recent hit (e.g., the toy vehicle 510 disassembling responsive to a strike from one of the foam darts 415). Additionally, such a trigger could be accompanied by lighting and/or acoustic effects in order to enhance the realism of the explosion. For example, the triggering of the mechanism could be accompanied by a speaker within the toy vehicle 510 could output an explosion sound effect, while lights within the spring-loaded pieces of the toy vehicle 510 flash. Advantageously, doing so creates the appearance of the toy vehicle 510 exploding, responsive to a particular event (e.g., a strike from a foam dart). Of note, while the depicted embodiment is a toy vehicle, it is broadly contemplated that the techniques described herein are not limited to vehicles and may be adapted to producing a visual response from any type of object.

Figure 6:
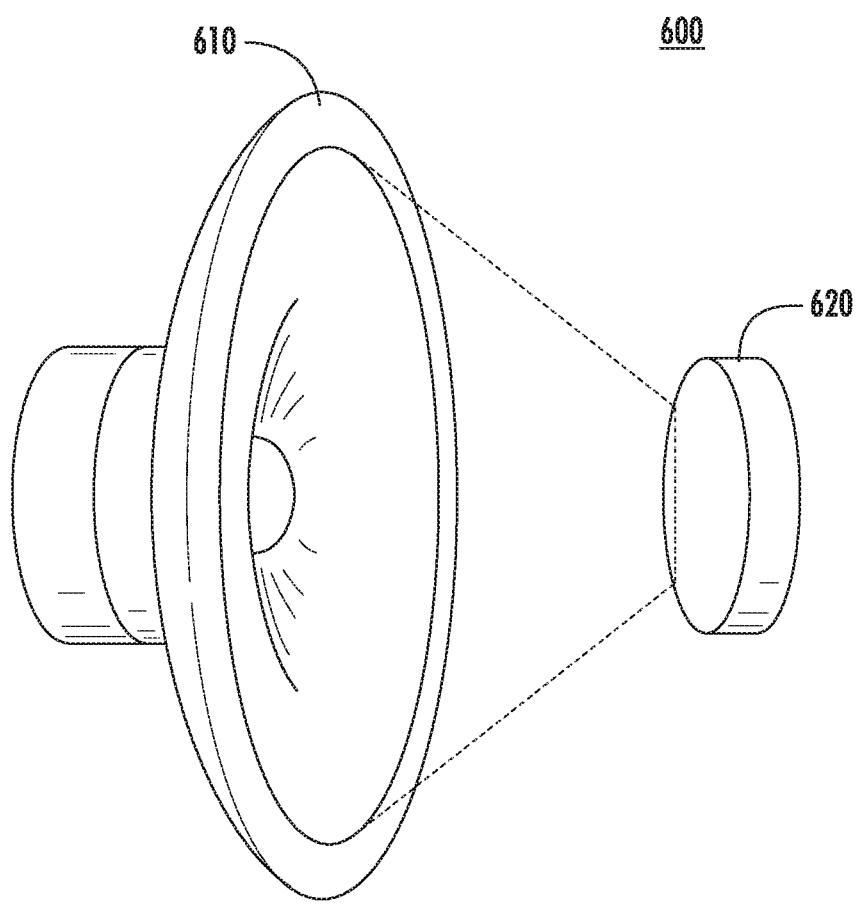
FIG. 6 illustrates an interaction between a speaker and a depressible mechanism, according to one embodiment described herein.

In one embodiment, a speaker within the toy vehicle 510 can be configured to trigger the mechanism that releases the spring-loaded pieces, causing the toy vehicle 510 to disassemble. An example of this is shown in FIG. 6, which shows a system 600 that includes a speaker 610 and a release mechanism 620. Here, the release mechanism 620 is positioned such that a diaphragm of the speaker 610 will depress the release mechanism 620, when sounds of certain frequencies and amplitudes are played through the speaker 610. For example, the release mechanism 620 could be depressed by the diaphragm of the speaker when low frequency, high amplitude sounds are played through the speaker 610. However, the playback of other sounds through the speaker 610 may not induce sufficient movement in the diaphragm to depress the release mechanism 620, allowing the speaker 610 to be used for multiple purposes (i.e., sound playback as well as release mechanism 620 activation).

Thus, for example, a user could control the turret shown in FIG. 4 using a software application and the bore-sighted camera device 410, and could launch the foam darts 415 at the vehicle 510. The vehicle 510 could detect hits from the foam darts by determining that readings from an accelerometer within the vehicle 510 match a predefined accelerometer signature corresponding to a physical projectile striking the vehicle 510. In response to detecting the vehicle 510 has received a number of hits exceeding a predefined threshold amount of hits, the vehicle 510 could cause the speaker 610 to emit a particular sound, such that the diaphragm of the speaker 610 depresses the release mechanism 620. In response to the release mechanism 620 being triggered, the spring-loaded parts that make up the vehicle 510 could be released, causing the vehicle 510 to disassemble and appear to explode. The vehicle 510 could also output an explosion sound and could trigger a number of light effects, further enhancing the explosion effect. Advantageously, doing so provides a fun and immersive playtime experience using the interactive devices.

Figure 7:
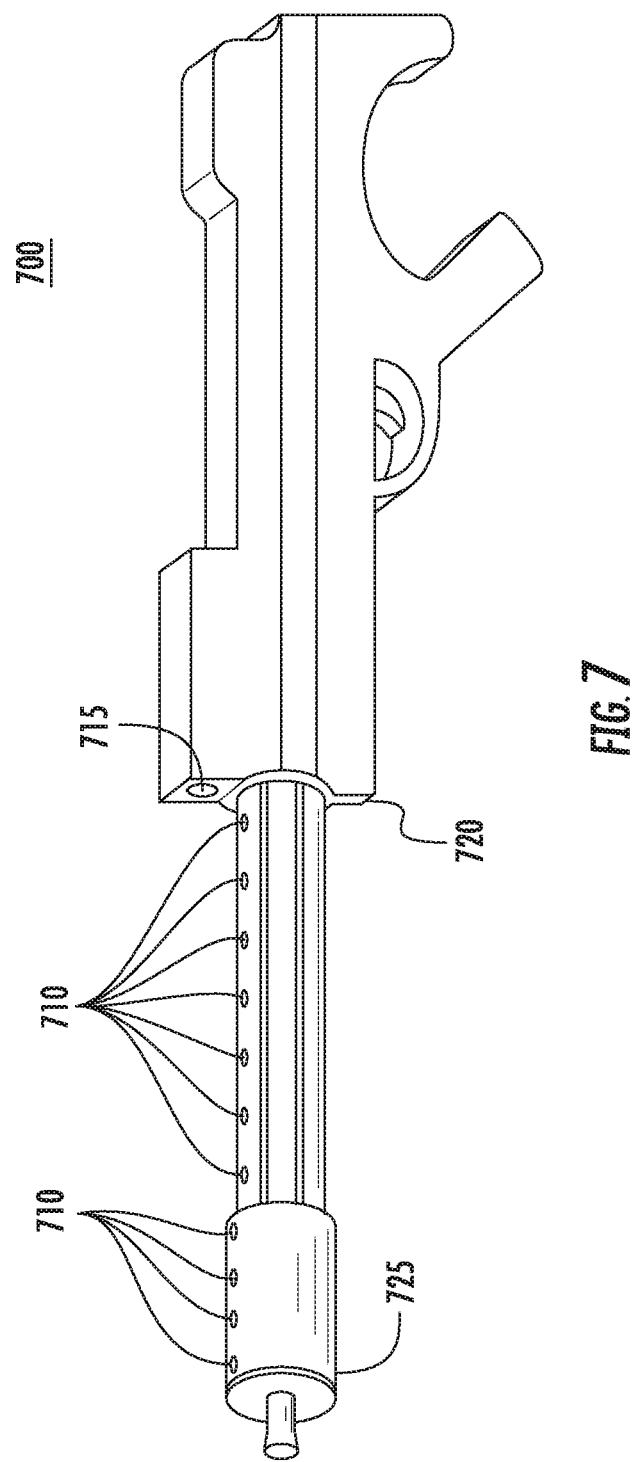
FIG. 7 illustrates a toy blaster storytelling device, according to one embodiment described herein.

In addition to interactions between the devices (e.g., the Hulk® action figure, the Iron Man® action figure, the exploding vehicle 510, etc.), the devices may be configured to interact with users as well. For example, a user could manipulate a toy blaster configured to "shoot" coded infrared signals and could interact with the interactive devices by firing the toy blaster at the devices (e.g., causing the Hulk® action figure to vibrate, causing the exploding vehicle 510 to vibrate and/or disassemble, etc.). An example of such a device is shown in FIG. 7, which illustrates a Star Wars® blaster toy 700 that includes an infrared emitter device 715 and a multitude of lights 710. The infrared emitter device 715 can be configured to transmit coded infrared signals in the direction the blaster rifle 700 is aimed, responsive to a user manipulating a trigger of the blaster rifle 700.

The lights 710 can be used to create an optical illusion of a "corpuscle" or beam of light traversing the air, so as to simulate a laser pulse gun effect (e.g., as in the movie Star Wars®). Generally, the lights 710 can be any devices adapted to emit light (e.g., a light emitting diode). Here, the blaster rifle 700 may illuminate the lights 710 in sequence, starting from the base-end 720 of the barrel and continuing to the muzzle-end 725 of the barrel, responsive to a user depressing the trigger device of the blaster rifle 700. By illuminating the lights in sequence, the blaster rifle 700 can produce an illusion of motion in a beam of light emitting from the rifle 700. Moreover, the speed at which the sequence of lights illuminates and the duration each light remains lit can be adjusted, depending on the visual effect desired. In one embodiment, the speed and the duration each light remains lit are equal, such that each light after the first light is illuminated as the previous light is extinguished. Additionally, the lights could be covered with a material adapted to disperse the light in order to enhance the visual effect (i.e., creating the visual effect of a "beam" of light, rather than a sequence of individual lights).

Figure 8:
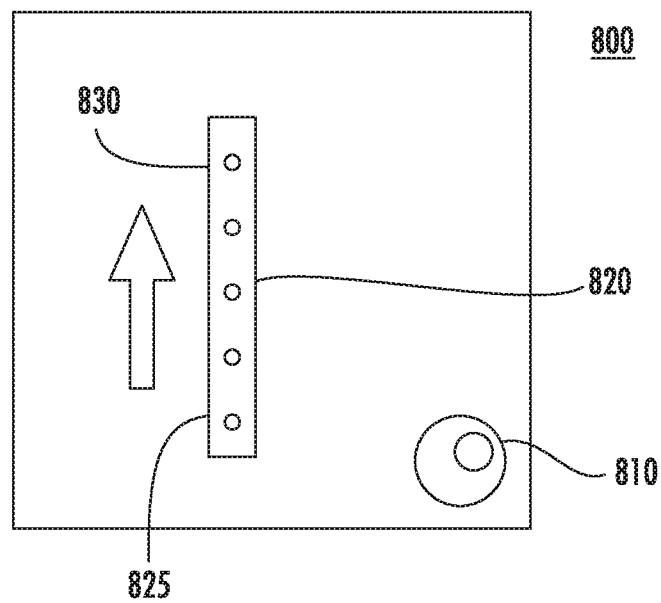
FIG. 8 illustrates a target storytelling device, according to one embodiment described herein.

As discussed above, a coded infrared signal can also be transmitted (e.g., using the transmitter 715), responsive to the user depressing the blaster rifle's trigger. In one embodiment, a target device is configured to receive such an infrared signal and, in response, to create a sequence of lights on the target device, in order to continue the optical illusion of the corpuscle or beam of light traversing the air. An example of such a target device is shown in FIG. 8, which illustrates a target device 800 configured with an infrared receiver 810 and a sequence of lights 820. The infrared receiver 810 could be configured to receive the coded infrared signal from the blaster rifle 700 and, in response, to initiate a sequence of illuminating the lights 820 in order to continue the optical illusion produced by illuminating the lights 710 in sequence. For example, the lights 820 could be illuminated in sequence from the bottom portion 825 to the top portion 830. Moreover, the speed at which the sequence progresses from one light to the next may be configured, depending on the visual effect desired. In one embodiment, each light in the sequence after the first is configured to illuminate when the previous light in the sequence is extinguished. Advantageously, by tying the sequences of lights 820 and 710 together, embodiments can create an illusion of motion for a "beam" of light emitting from the blaster rifle 700 and going into the target 800 (e.g., similar to the blasts of light in the Star Wars® movie franchise).

Figure 9:
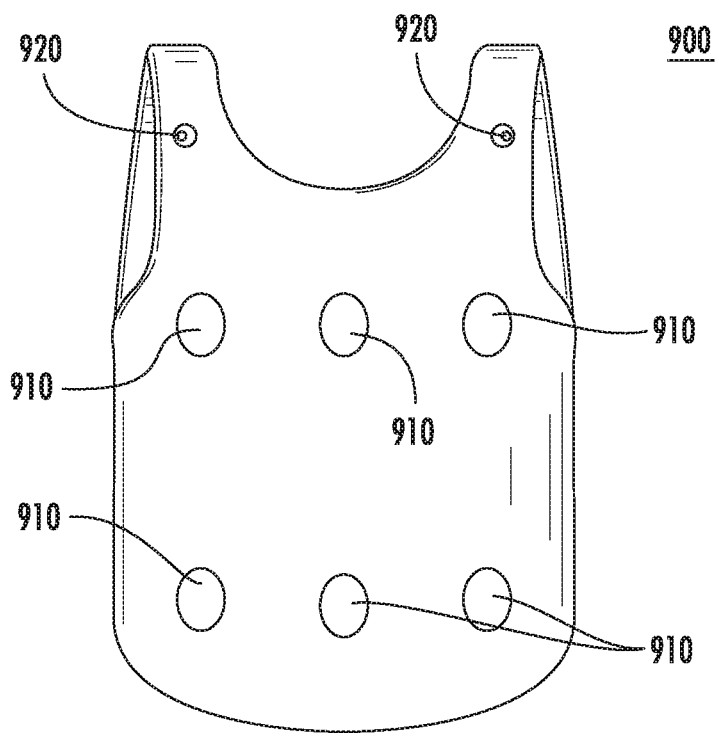
FIG. 9 illustrates a haptic feedback vest storytelling device, according to one embodiment described herein.

One embodiment provides a haptic feedback vest, configured to interact with the interactive devices described herein. An example of such a vest is shown in FIG. 9, which depicts a vest 900 configured with a plurality of speaker elements 910 and infrared receivers 920. In one embodiment, the vest 900 is configured with a sequence of lights, similar to the lights 820 on the target device 800. Such lights could be used to continue an optical illusion created by another device, such as the blaster rifle 700. Here, each of the speakers 910 is configured to emit a sound configured to produce a vibration (e.g., a low frequency, high amplitude sound), responsive to a trigger event.

For example, one of the infrared receivers 920 could receive a coded infrared signal from the blaster rifle 700, and logic for the haptic vest 900 could determine a direction from which the infrared signal was received. Generally, any technique for determining the blaster rifle's 700 position relative to the vest 900 may be used, consistent with the functionality described herein. The logic could then determine one or more of the speaker devices 910 oriented in the direction of the blaster rifle 700, and could cause the determined one or more speaker devices 910 to emit a sound configured to produce a vibration. Advantageously, doing so provides haptic feedback to the wearer of the vest, enhancing the realism of getting "shot" with the toy blaster. Similarly, the haptic vest 900 could provide haptic feedback (e.g., by causing one of the speakers 910 to vibrate) responsive to the vest 900 being struck by, for example, one of the foam darts 415 or by a coded infrared signal corresponding to the Iron Man® action figure's repulsor ray, and may provide the feedback using speakers oriented in the direction of the source of the strike (e.g., in the direction of the foam dart turret or the Iron Man® action figure). In one embodiment, the vest 900 additionally or alternatively provides haptic feedback using non-speaker devices, such as a vibration motor.

In a particular embodiment, the coded infrared signals may include type information and the vest 900 could use the type information to determine the appropriate haptic response for the received signal. For instance, the vest 900 could alter the duration, intensity, and/or number of speakers 910 used to provide haptic feedback for the signal, based on the type of the signal. For example, for an infrared signal of the "Star Wars® blaster rifle" type, the haptic vest 900 could trigger a brief vibration using one of the speaker devices 910 in the direction of the signal's source. As another example, for an infrared signal of the "foam missile" type (e.g., one of the foam darts 415), the vest 900 could simulate an explosion by triggering a longer duration vibration in a number of the speaker devices 910, in the direction from which the foam dart originated. As yet another example, for an infrared signal of the "repulsor ray" type (e.g., from the Iron Man® action figure), the vest 900 could simulate a sustained ray by causing one of the speakers 910 in the direction from which the signal was received to vibrate for a sustained period of time. Doing so helps to enhance the realism of the interactive play experience, as the user receives haptic feedback corresponding to the type of attack the user sustained.

While the above examples refer to a vest designed to provide haptic feedback to the wearer, such an example is provided for illustrative purposes only and without limitation. More generally, embodiments may be configured to provide haptic feedback with any sort of worn garment or article. Examples of such articles include body armor, helmets, dresses, gloves, shoes and so on. For instance, one embodiment provides a glove for use in controlling other objects and interactions, and such a glove may be configured to also provide haptic feedback to the user through the aforementioned techniques or analogous techniques.

For example, a glove could be configured as a radio-controlled (RC) vehicle controller and could be used to simulate a user having "force" powers in a Star Wars®-themed storytelling environment. For example, a force glove storytelling device could include sensors configured to detect the movement of the glove, and the glove could further include a transmitter device (e.g., a radio frequency (RF) transmitter) configured to transmit commands when predefined glove movements are performed. For instance, the toy vehicle 510 could be configured with an RF receiver for receiving commands from the force glove storytelling device. In such an example, the glove storytelling device could detect when the user points his hand wearing the force glove at the toy vehicle 510 with the user's fingers extended, and could transmit commands to control the movement of the toy vehicle 510 responsive to the movement of the user's hand. For instance, if the user moves his hand to the left, the toy vehicle 510 could be configured to drive in the direction of the hand movement (e.g., the leftward direction from the user's perspective), and the vehicle 510 could continue moving until the movement of the user's hand ceases. Moreover, haptic feedback could be provided to the user through the glove, e.g., through the use of one or more speakers configured to produce vibrations. For instance, such feedback could be provided as the user moves the toy vehicle 510, and could cease when the movement of the vehicle 510 ceases.

In addition to controlling the movement of other storytelling devices, such a force glove can be configured to control other actions of the other storytelling devices as well. For example, the glove storytelling device could detect when the user points the hand wearing the force glove at the toy vehicle 510, and upon detecting the user has clinched his first wearing the force glove (i.e., a predefined action has been performed), could trigger the exploding mechanism (e.g., the mechanism shown in FIG. 6) to cause the toy vehicle 510 to explode into a number of pieces (i.e., a predefined response corresponding to the performed action). Doing so provides a fun and intuitive way for remotely controlling the storytelling devices. Additionally, haptic feedback could be provided through the glove as the vehicle is exploding, further enhancing the storytelling experience.

Distributed Storytelling Environment

Figure 10:
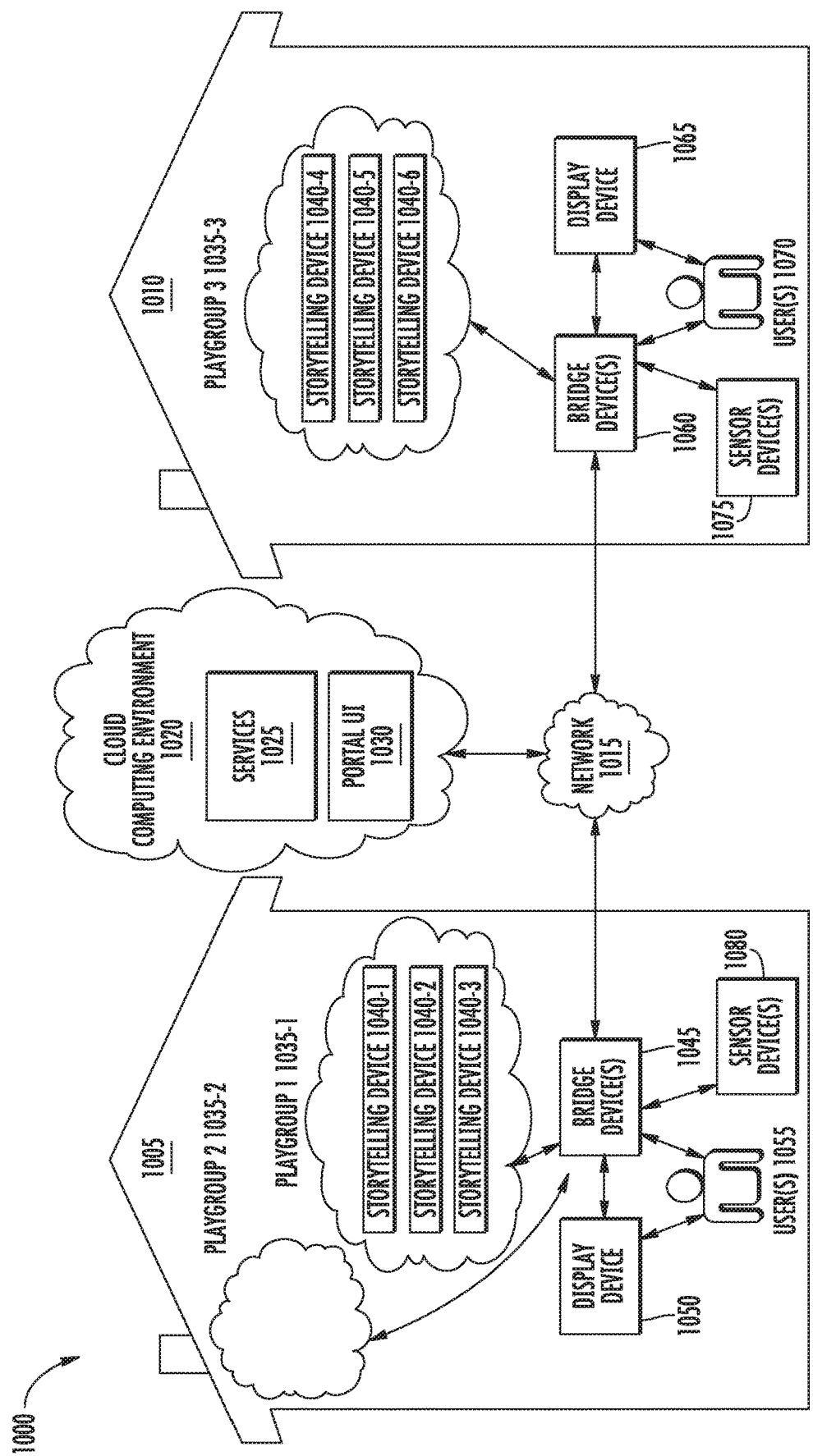
FIG. 10 illustrates a distributed storytelling environment comprising a plurality of playgroups at remote physical locations, according to one embodiment described herein.

FIG. 10 illustrates a distributed storytelling environment comprising a plurality of playgroups at remote physical locations, according to one embodiment described herein. As shown, the environment 1000 includes a cloud computing environment 1020 and home environments 1005, 1010, all of which are interconnected via a network 1015. The cloud computing environment 1020 hosts a plurality of services 1025 and a portal user interface (UI) 1030. The home environment 1005 includes two playgroups 1035-1, 1035-2 that include storytelling devices 1040, as well as one or more user(s) 1055 and one or more bridge device(s) 1045. Here, the user(s) 1055 may connect with the bridge device 1045 via a software application (e.g., executing on a mobile device, rendered within a web browser, etc.). Similarly, home environment 1010 includes a playgroup 1035-3 comprising a plurality of storytelling devices 1040, one or more user(s) 1070, and one or more bridge device(s) 1060.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 1025 from any computing system attached to a network connected to the cloud (e.g., the Internet).

Each playgroup 1035 generally represents a set of storytelling devices 1040 involved in a unique storytelling or playtime experience. For instance, a first playgroup 1035 represents a science fiction-themed storytelling experience and includes a light sword storytelling device 1040, an action figure controller storytelling device 1040, and a trainer storytelling device 1040. Likewise, the playgroup 1035 also represents a science fiction-themed storytelling experience and includes a light sword controller storytelling device 1040 and an action figure storytelling device 1040. More generally, however, the playgroups may contain any number of storytelling devices 1040 of any number of different themes and types.

Generally, the playgroups 1035 include storytelling devices that are located within a particular physical location (e.g., a room within the house environment 1005). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices 1040 could emit a first signal (e.g., an infrared signal) and the other storytelling devices 1040 could be configured to transmit a response (e.g., a radio frequency signal (RF)) upon receiving the first signal. The storytelling device(s) could then receive the responses from the other storytelling devices and could form a playgroup 1035 that includes the other (responding) storytelling devices 1040 as well as the one or more (emitting) storytelling devices.

Generally, it is advantageous for at least one of the first signal and response signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

Certain storytelling devices 1040 can be designated as controller devices within each playgroup 1035. Generally, a controller device configures each of the storytelling devices within a playgroup 1035 to perform certain actions in response to a detected stimulus event and a current context of the story being told. Here, the story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices 1040 becoming unavailable (e.g., losing power, leaving the physical environment, etc.) or a new storytelling device 1040 being introduced to the environment (e.g., the user's friend comes over to play or initiates a remote play session, bringing one or more new storytelling devices 1040).

Additionally, the controller may maintain state information and control game logic for the playgroup 1035. For example, a first playgroup 1035 could be playing out a story in which a user is asked by the action figure storytelling device 1040 to deflect virtual laser beams fired from the trainer storytelling device 1040, using the light sword storytelling device 1040. Here, the elected controller device (i.e., action figure storytelling device 1040) could maintain a "hit points" value for the user that is decremented when the user fails to deflect one of the virtual lasers, and could further maintain a count of how many virtual laser beams the user has deflected thus far. Additionally, the controller could retrieve state data for the user (e.g., by querying one of the cloud-based services 1025 with an identifier for the user) and could use the user state data to adjust the playback of the story.

In addition to detecting nearby storytelling device within the same physical environment, the storytelling devices 1040 within a playgroup 1035 may elect one of the storytelling devices 1040 to operate as a controller storytelling device. A number of different techniques may be used for such an election. For example, a user could explicitly specify that a particular one of the storytelling devices (e.g., the user's favorite device) should be used as the controller. Here, it may be preferable for the user to select a device that will remain with the user throughout the storytelling experience, so as to avoid a subsequent controller election partway through playback of the story. In one embodiment, the controller may be elected based on technical specifications and properties of the storytelling devices 1040. For example, a storytelling device 1040 with a substantial amount of memory, processing power, and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attributed to a type or role of storytelling device (i.e., as opposed to a specific storytelling device). In mapping the story to the available and compatible storytelling devices, the controller storytelling device 1040 could determine a type of each of the storytelling devices, and could assign particular stimulus events and corresponding actions to each of the storytelling devices based on the determined type. For example, a particular story could state that an action should be performed by a storytelling device having the role of "Hero," and the controller could map the action onto a storytelling device within the playgroup having the role "Hero".

For instance, assuming that the storytelling device 1040 represents a first fictional character action figure, the controller storytelling device 1040 could assign any stimulus events and actions within the story that are specific to the fictional character to the action FIG. 1040. Likewise, if the story includes any stimulus events and actions designated for a hero-type character in the science fiction universe, the controller storytelling device 1040 could assign these stimulus events and the corresponding actions to the storytelling device 1040 as well. In the event multiple storytelling devices 1040 are available that satisfy the criteria for a stimulus event/action combination (e.g., multiple hero devices are present and available within the playgroup), the controller storytelling device 1040 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. Advantageously, dynamically mapping the story onto the available and compatible storytelling devices 1040 allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for an action figure storytelling device 1040 and a separate, distinct action designated for a different hero character-based storytelling device 1040. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action FIG. 1040 could detect when the user has successfully deflected a virtual laser beam fired from the storytelling device 1040 (i.e., an occurrence of the stimulus event), and could audibly congratulate the user in response (i.e., performing the corresponding effect).

As discussed above, in addition to defining roles associated with each stimulus event, the story may also define a corresponding action to be performed in response to the stimulus event. For instance, the story could explicitly define dialogue to be audibly output by a storytelling device 1040 matching the defined role. In one embodiment, the story defines a class of action that should be performed by a storytelling device, in response to a corresponding stimulus event.

Each home environment 1005, 1010 also includes a respective display device 1050, 1065 that is coupled with the bridge device 1045, 1060 and configured to display information relating to storytelling devices 1040 located remotely. In other words, the display device 1050 in home environment 1005 can display information related to storytelling devices 1040-4, 1040-5, 1040-6 located in home environment 1010, and display device 1065 in home environment 1010 can display information related to storytelling devices 1040-1, 1040-2, 1040-3 located in home environment 1005. The ability to depict—and to interact with—remotely-located storytelling devices 1040 enhances the immersive playtime experience for users 1055, 1070, giving the users 1055, 1070 the perception of playing together though located remotely.

The display devices 1050, 1065 may include visual displays of any suitable type. Some non-limiting examples of display devices 1050, 1065 implemented using current display technologies include computer monitors, televisions, and integrated displays such as laptop screens, tablet screens, mobile phone screens, and so forth. Other non-limiting examples of display devices 1050, 1065 include holographic or other three-dimensional (3D) displays. The display devices 1050, 1065 may be integrated with the respective bridge device 1045, 1060 or may be separate. In some cases, the display devices 1050, 1065 may be integrated in a body-wearable device, such as a lenspiece through which the wearing user 1055, 1070 views the physical home environment 1005, 1010 during the storytelling experience.

In some cases, the display devices 1050, 1065 may generate depictions of the remotely-located storytelling devices 1040 as part of an augmented reality (AR) or a virtual reality (VR) display. For AR display implementations, the display device 1050 of home environment 1005 may overlay depictions of the remotely-located storytelling devices 1040 (e.g., storytelling devices 1040-4, 1040-5, 1040-6) onto the field of view of the user 1055 based on a determined positioning of the remotely-located storytelling devices 1040-4, 1040-5, 1040-6 relative to the local storytelling devices 1040-1, 1040-2, 1040-3 of the home environment 1005. Similarly, display device 1065 may overlay depictions of the storytelling devices 1040 that are part of the home environment 1005.

Further, the home environments 1005, 1010 may each include one or more sensor devices 1080, 1075 such as visual (e.g., sensing visible and/or infrared (IR) wavelengths) sensors whose sensed data can be used to determine position information for local storytelling devices 1040 and/or users 1055, 1070. Other non-limiting examples of sensor devices 1080, 1075 include inertial measurement units and navigation devices. The sensor devices 1080, 1075 may be included with, integrated with, or entirely separate from the display devices 1050, 1065, the bridge devices 1045, 1060, and the storytelling devices 1040. For example, a body-worn display device 1050 (e.g., including a lenspiece) may be integrated with a body-worn visual sensor device 1080 that is oriented to capture data representing the field of view of the user 1055 at various times during the storytelling experience.

In VR display implementations, the display devices 1050, 1065 may generate depictions of the local storytelling devices 1040 along with the depictions of remotely-located storytelling devices 1040.

In addition to merely viewing depictions of remotely-located storytelling devices 1040, in various embodiments users 1055, 1070 may interact with the depictions within the storytelling experience. Input data acquired by the sensor devices 1075, 1080 may be used to determine an interaction of the users 1055, 1070 with one or more depicted storytelling devices 1040. In some cases, visually determining that the user 1055, 1070 has shifted focus from a local storytelling device 1040 to a position consistent with a depiction of a remotely-located storytelling device 1040 can indicate that the user 1055, 1070 wishes to interact with the depicted storytelling device. In some cases, the location and/or orientation data for a local storytelling device 1040 may be determined from input data from sensor devices 1075, 1080. Predetermined changes to the location and/or orientation data of the local storytelling device 1040 (e.g., movements caused by a user 1055, 1070 during the storytelling experience) relative to a depiction of a remotely-located storytelling device 1040 can indicate that the user 1055, 1070 wishes to interact with the depicted storytelling device. For example, a body-worn repulsor ray device may be raised by a user 1055, 1070 during play and "aimed" at the depicted storytelling device 1040.

The display devices 1050, 1065 are configured to display animation sequences and/or other effects relating to the depicted storytelling devices 1040. Some of the animation sequences/effects can be performed responsive to local or remote user input with the depicted storytelling devices 1040. The animation sequences/effects may include audiovisual elements consistent with the predetermined actions that are performed by the storytelling devices 1040. For example, upon detecting a repulsor ray or projectile hit at a first storytelling device 1040, the depiction of the first storytelling device may be animated to illustrate the projectile hit as well as the resulting reaction of the storytelling device. Continuing an earlier example, say a Hulk® action figure is one storytelling device 1040 included in the home environment 1010. The Hulk® action figure is also depicted using the display device 1050 of home environment 1005. Upon detecting a first hit, the depiction of the Hulk® action figure on display device 1050, 1065 could be animated to show the action of roaring, corresponding to the prerecorded roaring sound produced by the action figure itself. Further, one or more speakers associated with the home environment 1005 may be used to produce a roaring sound to accompany the roaring animation.

While the animations sequences/effects may depict the same predetermined physical actions performed by the corresponding storytelling device 1040, the animations sequences/effects need not be limited to those actions. The depicted animations can be more richly detailed and thus appear more realistic than the relatively limited mechanical movements of the storytelling devices 1040, which helps to enhance the immersive nature of the storytelling environment. Further, according to various embodiments described herein, the animation sequences/effects that are used for depictions of storytelling devices 1040 may be at least partially synchronized with actions that are performed locally by the storytelling devices 1040, so that users 1055, 1070 at remote locations perceive a unified, cohesive play environment.

In some embodiments, the interaction of users 1055, 1070 with depictions of remotely-located storytelling devices 1040 can be used to trigger physical actions of the storytelling devices 1040. For example, after sighting in on a depiction of a remote storytelling device 1040-4, the user 1055 uses a local storytelling device 1040-1 (e.g., a body-worn repulsor ray blaster) to fire a repulsor ray at the depiction. Related data from the local storytelling device 1040-1 causes an animation sequence/effects to be displayed on the local display device 1050, and further causes a physical action to occur at the storytelling device 1040-4 at the home environment 1010, consistent with receiving a repulsor ray hit from local users 1070.

Figure 11:
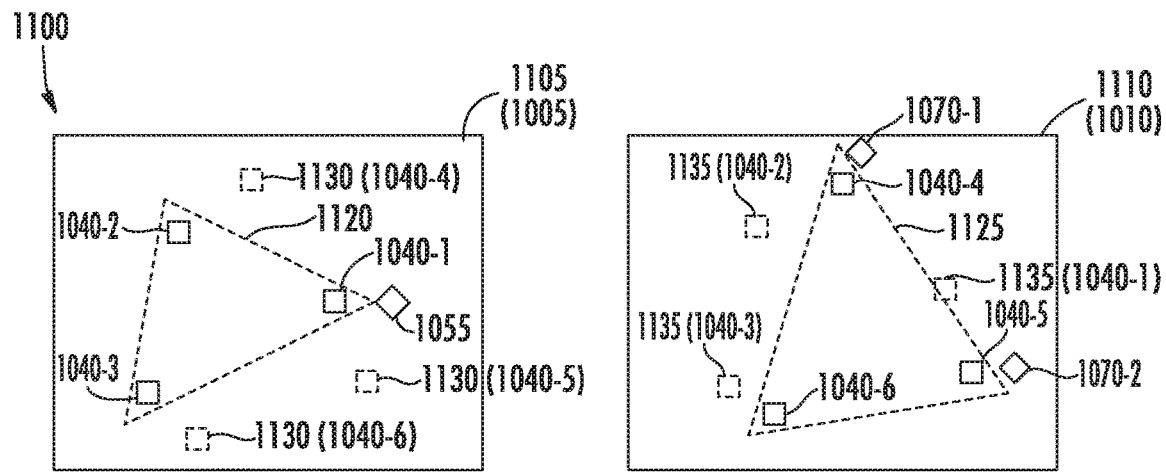
FIG. 11 illustrates a spatial mapping of a distributed storytelling environment spanning remote physical locations, according to one embodiment described herein.

FIG. 11 illustrates a spatial mapping of a distributed storytelling environment spanning remote physical locations, according to one embodiment described herein. More specifically, the distributed storytelling environment 1100 represents a top-down view (or floor plan) of the storytelling environment, as mapped onto each home environment 1005, 1010. Mapping 1105 corresponds to storytelling devices 1040 and/or users 1055 located in home environment 1005, and mapping 1110 corresponds to storytelling devices 1040 and/or users 1070 located in home environment 1010. Although not explicitly shown in a top-down view, the mappings 1105, 1110 may include additional positional information for depicting storytelling devices 1040 and/or users 1070, such as relative height (e.g., in a direction extending into and out of the page).

The storytelling devices 1040 local to each home environment 1005, 1010 are depicted as solid-lined square shapes within each mapping 1105, 1110. The storytelling devices 1040 local to home environment 1005 collectively have an arrangement that is represented by a bounding shape 1120. Likewise, the storytelling devices 1040 local to home environment 1010 have an arrangement that is represented by bounding shape 1125. The bounding shapes 1120, 1225 are meant as one non-limiting example of representing the collective physical arrangement of local storytelling devices 1040.

Users 1055, 1070-1, 1070-2 are represented by solid-lined diamond shapes in the mappings 1105, 1110. In some embodiments, positional information for the users 1055, 1070-1, 1070-2 can be detected using sensor devices deployed within the home environments 1005, 1010. In some embodiments, positional information for the users 1055, 1070-1, 1070-2 can be detected using body-worn or carried storytelling devices 1040. For example, storytelling device 1040-1 could be a blaster rifle that is carried by the user 1055.

Remote storytelling devices 1040 are depicted as dashed-line square shapes at positions 1130, 1135 within each mapping 1105, 1110. The positions 1130, 1135 generally correspond to the bounding shapes 1120, 1125. In some cases, and as shown, the bounding shapes 1120, 1125 may be overlaid within each mapping 1105, 1110 without significant adjustment. In other cases, however, one or more of the bounding shapes 1120, 1125 may be altered to locate positions 1130, 1135 in a desired relative arrangement with the local storytelling devices 1040. For example, the bounding shapes 1120, 1125 may be rotated, scaled, and/or spatially distorted (e.g., skewed) to achieve the desired arrangement of positions 1130, 1135. The positions 1130, 1135 may be determined relative to local storytelling devices 1040 based on any number of different factors. In some embodiments, the positions 1130, 1135 are determined based on the predetermined story to be played back within the storytelling experience. For example, a story having substantial dialogue between two characters represented by one local storytelling device 1040 and one remote storytelling device 1040 may cause the remote storytelling device 1040 to be mapped onto a position 1130, 1135 that is relatively near the local storytelling device 1040. In this way, the local user can view the local storytelling device 1040 and the depiction of the remote storytelling device 1040 during the dialogue without needing to turn significantly each time the speaker changes. In another example, a story may have two characters that are opposed to each other for purposes of the story (e.g., enemies, opponents, arguing characters). Here, the position 1130, 1135 of the remote storytelling device 1040 may be relatively mapped relatively further from the local storytelling device 1040 to emphasize to the user the opposition of the characters.

In some embodiments, the positions 1130, 1135 are determined based on the physical properties of the home environments 1005, 1010. Sensor devices may be used to determine the presence of one or more objects or other obstructions in the home environments 1005, 1010, and to relocate a position 1130, 1135 of a remote storytelling device 1040 based on the determined obstruction(s). For example, an initial mapping may have located a depiction of a remote storytelling device at a position in the home environment that is occupied by a sofa. The initial mapping may be altered to place the depiction in a non-overlapping position relative to the sofa (e.g., above, below, to the left or right).

The positions 1130, 1135 may also be determined based on the positions of the local storytelling devices 1040 and/or users 1055, 1070-1, 1070-2. Some non-limiting examples include avoiding overlapping of local and remote storytelling devices 1040, maintaining a scale (e.g., controlling the bounding shapes 1120, 1125 to have comparable dimension(s)), and placing users 1055, 1070-1, 1070-2 and/or certain storytelling devices 1040 at desired positions relative to each other. In one example, the users 1055, 1070-1, 1070-2 and/or one or more storytelling devices 1040 may be grouped together as a team and may be mapped more closely together to face a frontline of "enemy" characters represented by other storytelling devices 1040. In another example, the users 1055, 1070-1, 1070-2 may be grouped into different teams and spatially separated to promote a more competitive feel within the storytelling environment.

Users 1055, 1070-1, 1070-2 that are located within one particular home environment 1005, 1010 can also be depicted using the display device at another remote home environment. For example, the user 1055 may be depicted at position 1135 (1040-1) within mapping 1110. The depiction of the users 1055, 1070-1, 1070-2 can be based on visual sensor data, pre-stored photographs, etc. The users 1055, 1070-1, 1070-2 may be depicted as avatars that are selected via user input and/or assigned based on worn or carried storytelling devices 1040. For example, if user 1055 wears a repulsor ray wearable storytelling device 1040 (corresponding to the Iron Man® character), user 1055 may be depicted as Iron Man® on the display device for other remote users 1070-1, 1070-2. Advantageously, allowing the users 1055, 1070-1, 1070-2 to be depicted as different characters within the storytelling environment increases the immersive nature of the storytelling environment and increases user interest therein.

Furthermore, while mappings 1105, 1110 include storytelling devices 1040 corresponding to two home environments 1005, 1010, other embodiments may include additional users and additional home environments for a more robust collaborative play experience.

Figures 12A, 12B:
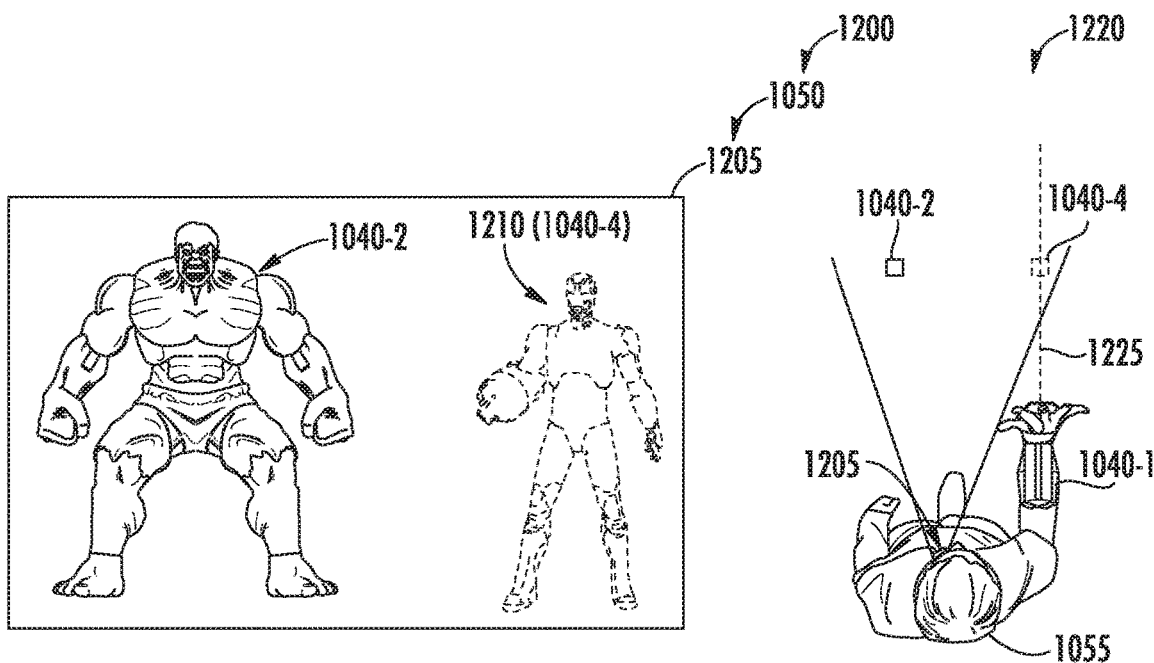
FIGS. 12A-C illustrate user interaction with a remote storytelling device through augmented reality, according to one embodiment described herein.
Figure 12C:
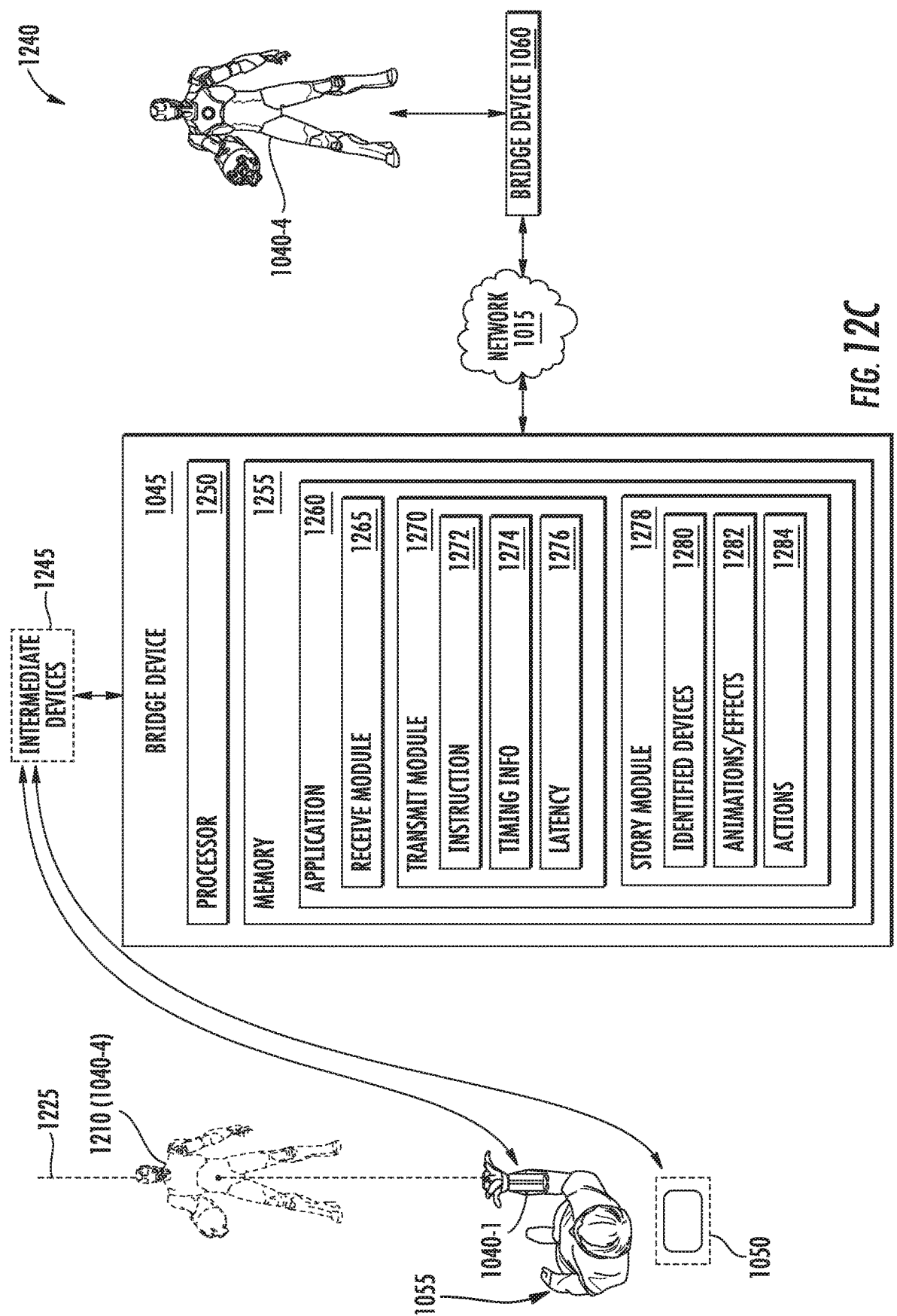

FIGS. 12A-C illustrate user interaction with a remote storytelling device through augmented reality, according to one embodiment described herein. More specifically, views 1200, 1220, and 1240 include portions of a wearable implementation of display device 1050. Display device 1050 includes a lenspiece 1205 that is worn in front of the eye of user 1055. Although not shown, the lenspiece 1205 may be coupled with additional structural elements to enable comfortable wear by the user, such as a frame similar to eyeglasses, although other implementations are possible. The display device 1050 may include additional functionality, such as one or more visual sensors configured to determine the user's 1055 field of view. In some cases, the display device 1050 may be a separate storytelling device 1040 that is configured to communicate with other storytelling devices 1040 and/or an associated bridge device 1045, 1060.

View 1200 provides an example of an augmented reality (AR) display, in which information is displayed in portions of the lenspiece 1205 to complement the natural view of the user 1055 but not entirely replace the user's view of the environment. Generally, view 1200 corresponds to the mapping 1105 of home environment 1005 of FIG. 11. The user 1055 views storytelling device 1040-2 (here, a Hulk® action figure) through the lenspiece 1205, and a depiction 1210 of a remote storytelling device 1040-4 (an Iron Man® action figure) is displayed in the lenspiece 1205 having positioning relative to the local storytelling device 1040-2.

In view 1220, which corresponds to view 1200, the user 1055 interacts with the environment, and more specifically the depiction 1210 of the remote storytelling device 1040-4. As shown, the user 1055 is wearing storytelling device 1040-1 (a repulsor ray blaster) and has raised his/her arm to orient the storytelling device 1040-1 along orientation 1225 to thereby aim at the depiction 1210. The user's 1055 intent to interact with depicted remote storytelling devices 1040 may be determined using any suitable method. In some embodiments, visual sensors may determine a focus of the user 1055 based on, e.g., the relative positioning of the storytelling device 1040-2 and depiction 1210. For example, if the position of depiction 1210 is determined to be closer to the center of the user's determined field of view (e.g., closer to the center of lenspiece 1205) than the storytelling device 1040-2, the depiction 1210 can be determined as the user's 1055 focus.

In some embodiments, location and/or orientation data from the body-worn storytelling device 1040-1 can be used to determine the user's 1055 aim. For example, the user 1055 may have initially aimed the storytelling device 1040-1 at the local storytelling device 1040-2, which could be determined using field of view information for the user 1055, location and/or orientation data for storytelling device 1040-1, infrared signals communicated between storytelling devices 1040-1, 1040-2, etc. If subsequent location and/or orientation data for storytelling device 1040-1 (e.g., inertial measurements, external visual sensors) indicates that the storytelling device 1040-1 was swept to the right from its initial aim at storytelling device 1040-2, it may be deduced that the user 1055 aimed the storytelling device 1040-1 at the depiction 1210 of the remote storytelling device 1040-4.

FIG. 12C illustrates a user interaction with a depicted storytelling device, according to one embodiment. More specifically, view 1240 illustrates the effects on the remotely-located storytelling device after the user interaction with the depiction of the storytelling device.

As shown, the determined interaction is the user 1055 firing a blast using a repulsor ray blaster (i.e., storytelling device 1040-1) at the depiction 1210 of remote storytelling device 1040-4. Data from the storytelling device 1040-1, the display device 1050, and/or sensor devices are communicated to the bridge device 1045. The data may optionally be transferred to one or more intermediate devices 1245, where it may be processed (e.g., analyzed, formatted, etc.) before transmission to the bridge device 1045.

In this example, the bridge device 1045 includes, without limitation, a processor 1250 and memory 1255. The remotely-located bridge device 1060 and the bridge device 1045 may be similarly configured. Generally, the processor 1250 retrieves and executes programming instructions stored in the memory 1255. Processor 1250 is included to be representative of a single CPU, multiple CPUs, a single CPU having multiple processing cores, GPUs having multiple execution paths, and the like. The memory 1255 is generally included to be representative of a random access memory, but may further include non-volatile storage of any suitable types.

Memory 1255 includes an application 1260 that includes program code for performing various functions related to generating and maintaining the distributed storytelling environment. The application 1260 comprises a receive module 1265 that is generally configured to receive data from remote storytelling devices and/or other networked devices such as a remote bridge device 1060, devices providing cloud services (not shown), etc. during the storytelling experience to provide a cohesive storytelling environment across the different locations. The transmit module 1270 is generally configured to transmit instructions and/or various data to local storytelling devices 1040 and to remote storytelling devices 1040 via the network 1015 and bridge device 1060. The story module 1278 is generally configured to generate the story from one of a number of predetermined story templates, based on the storytelling devices 1040 that are available for participating in the storytelling experience.

To generate a particular story for playback during a storytelling experience, the story module 1278 may determine a set of identified devices 1280 that are available for participation in the storytelling experience. The story module 1278 may perform a local and/or remote registration function prior to generation of the story and/or during the playback of the generate story to dynamically update which identified devices 1280 are available for completing the story.

During the storytelling experience, the story module 1278 may include a number of predetermined actions 1284 to be performed by various ones of the identified devices 1280. The actions 1284 can be performed responsive to detected stimulus events. As generally discussed above, the actions 1284 performed by storytelling devices 1040 can include mechanical movement, output of audio and/or visual effects, speech, etc.

The story module 1278 may further be configured to produce one or more animation sequences and/or other effects 1282 (collectively referred to as "animations" or "animation sequences" 1282) using display device 1050 and corresponding to detected stimulus events. In some embodiments, the animations 1282 may be responsive to stimulus events that include depictions of remotely-located storytelling devices. For example, when the user 1055 fires a blast using a repulsor ray blaster (i.e., storytelling device 1040-1) at the depiction 1210 of remote storytelling device 1040-4, the story module 1278 may produce one or more animations 1282 to be displayed relative to the depiction 1210 on the display device 1050. The animations 1282 may further include other sensory feedback for the user 1055 such as audio and/or haptic output to more realistically simulate the presence of the storytelling device 1040-4 at the user's 1055 home environment.

In various embodiments, the actions 1284 and animations 1282 may be coordinated between different home environments to provide a more cohesive storytelling experience. For example, when the user 1055 fires the blast at the depiction 1210, the transmit module 1270 may generate an instruction 1272 to be performed by the storytelling device 1040-4 at the remote location. In this way, the virtual blaster hit by the user 1055 can be treated the same as if a user at the remote location registered a blaster hit on the storytelling device 1040-4 (e.g., by transmitting an infrared signal). Using generated instructions 1272, the virtual blaster hit may also be observed by users in the different home environments. Although not shown, in other embodiments, the user 1055 interacts with a local storytelling device 1040, and the generated instruction 1272 causes animations 1282 to be performed using depictions of the same storytelling device 1040 on remotely-located display devices.

To further enhance the perception of a unified and cohesive storytelling environment, the transmit module 1270 can coordinate the timing of the local animations 1282 or actions 1284 with remotely-performed animations 1282 or action(s) 1284 such that they are at least partly synchronized. In some embodiments, the transmit module 1270 includes timing information 1274 with the instruction 1272 in order to control the timing of the remotely-performed animations 1282 or action(s) 1284. The timing information 1274 may have any suitable form for indicating when the local animation 1282 or action 1284 has begun or will begin. For example, the timing information 1274 may include a timestamp, a specified amount of delay to be included before performing the remote animation/effect or action, and so forth. The transmit module 1270 may be further configured to determine a latency 1276 between the bridge devices 1045, 1060, and the determined latency 1276 can be used to adapt the instruction 1272 and/or timing information 1274 to provide a desired synchronization of the animations 1282 with action(s) 1284.

In some embodiments, the action 1284 can have a predetermined type that indicates a priority for how the action 1284 should be performed relative to the animations 1282. Some non-limiting examples of predetermined types include an accuracy priority and an immediacy priority. For example, if a particular action 1284 has an accuracy priority, performance of the action 1284 may be delayed so that the action 1284 is fully synchronized from the beginning with performing the animation 1282. If an action 1284 has an immediacy priority, performance of the action 1284 should not be delayed, but performance may begin partway through the action 1284 so that the action 1284 and animation 1282 become synchronized as soon as possible.

The story module 1278 may specify the types for the various actions 1284 as part of generating the story for playback. One of the predetermined types may be selected as a default; for example, actions 1284 by default have an accuracy priority (accepting relatively greater delay) unless otherwise specified. The story module 1278 may assign certain time-sensitive actions 1284 to have an immediacy priority (accepting relatively reduced accuracy of certain elements of the action), such as time-limited objectives within the story, competitive objectives between remote users, objectives requiring user inputs to occur in a particular order, and so forth.

Figure 13:
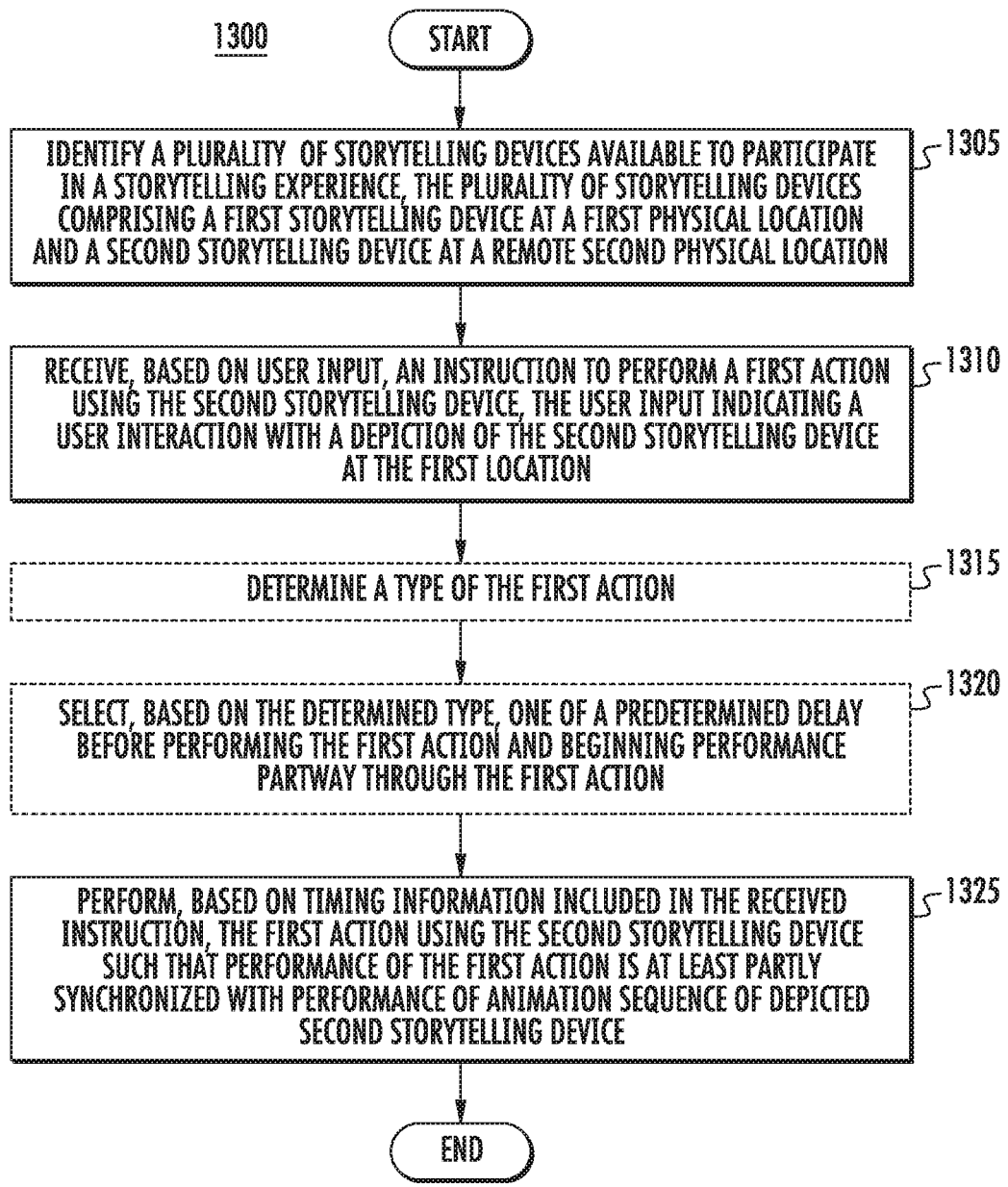
FIG. 13 illustrates a method of coordinating performance of an action by a storytelling device based on remote user input, according to one embodiment described herein.

FIG. 13 illustrates a method of coordinating performance of an action by a storytelling device based on remote user input, according to one embodiment described herein. Although generally described as performed by a single bridge device, the method 1300 may alternately be performed by multiple bridge devices or by a storytelling device comprising a controller component. Method 1300 begins at block 1305, where the bridge device identifies a plurality of storytelling devices is identified as available to participate in a storytelling experience. The plurality of storytelling devices comprises a first storytelling device at a first physical location and a second storytelling device at a remote second physical location.

At block 1310, and based on user input indicating a user interaction with a depiction of the second storytelling device at the first location, the bridge device receives an instruction to perform a first action using the second storytelling device.

At optional block 1315, the bridge device determines a type of the first action indicated by the received instruction. At optional block 1320, the bridge device selects, based on the determined type, one of a predetermined delay before performing the first action and beginning performance partway through the first action. In another embodiment, the method 1300 proceeds directly from block 1310 to block 1325 without selecting between including a predetermined delay and beginning performance partway through the first action.

At block 1325, the bridge device performs, based on timing information included in the received instruction, the first action using the second storytelling device such that performance of the first action is at least partly synchronized with a performance of an animation sequence of the depicted second storytelling device. Method 1300 ends following completion of block 1325.

Figure 14A:
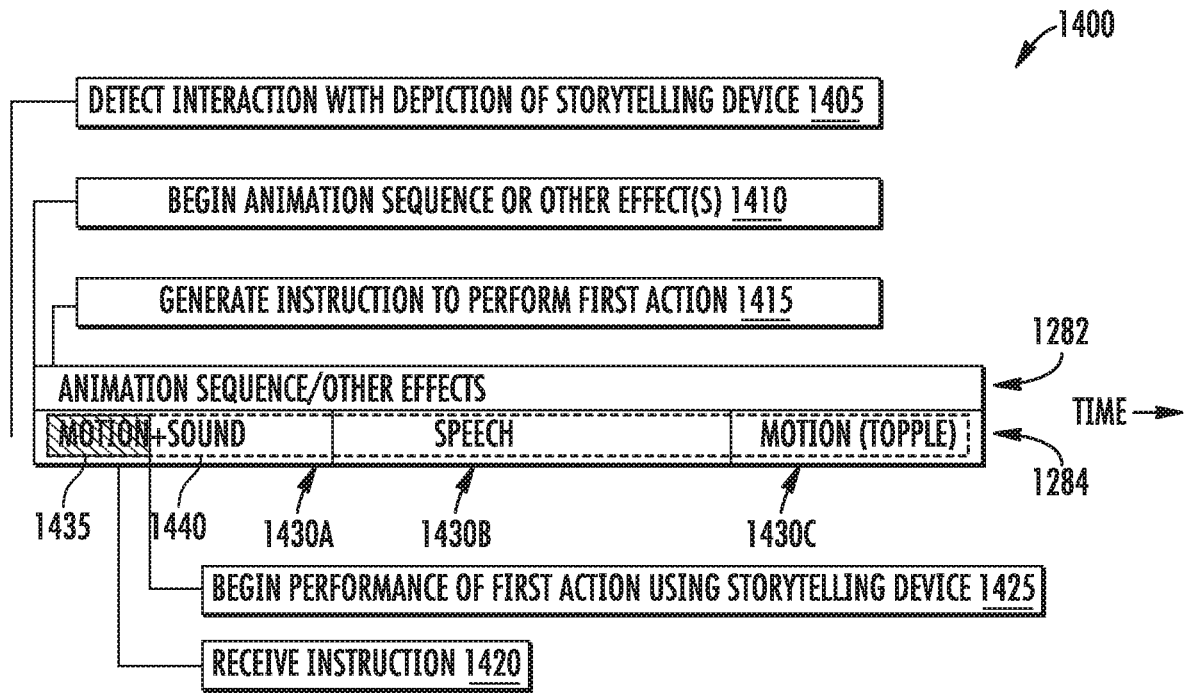
FIGS. 14A and 14B illustrate techniques for coordinating performance of an action by a storytelling device based on remote user input, according to one embodiment described herein.
Figure 14B:
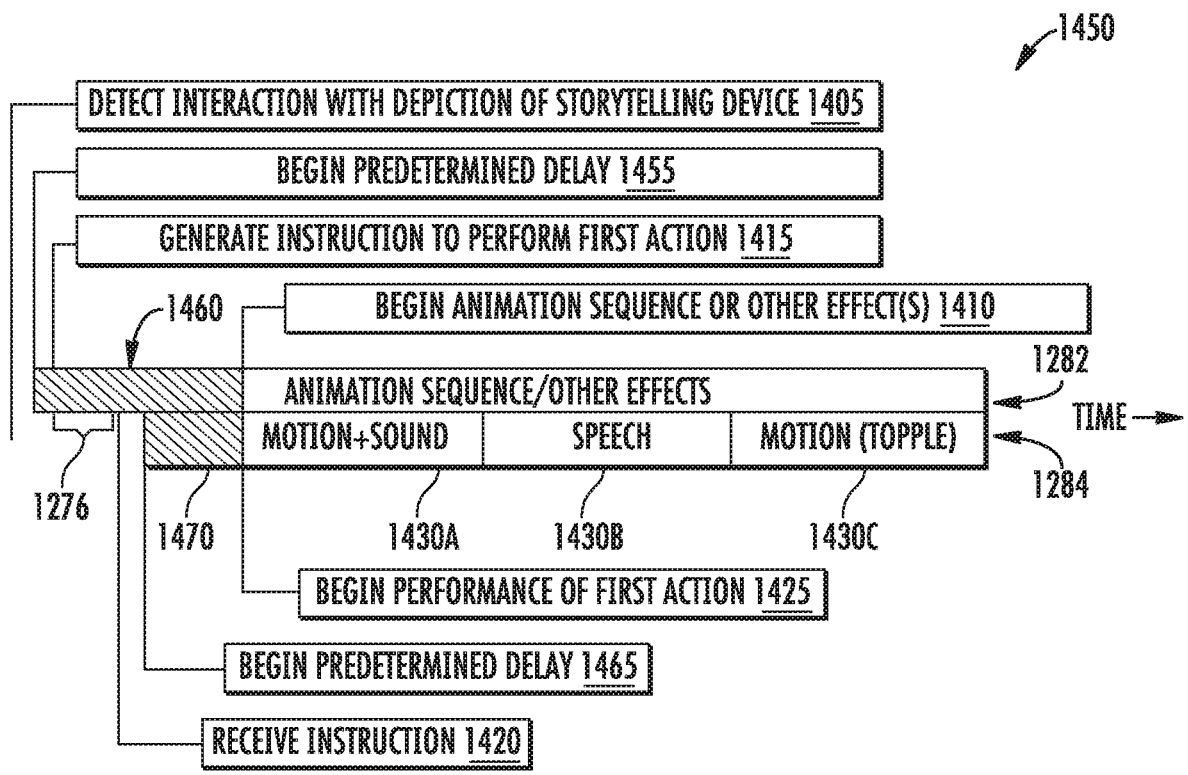

FIGS. 14A and 14B illustrate techniques for coordinating performance of an action by a storytelling device based on remote user input, according to one embodiment described herein. Further, the techniques discussed here may be used to coordinate an animation sequence or other effects for depicted storytelling devices based on remote user input. The techniques can achieve at least a partial synchronization between the augmented reality depiction of storytelling devices and the actions performed by the actual storytelling devices.

Timeline 1400 generally depicts beginning performance of a first action 1284 partway through the performance of an animation sequence 1282. At time 1405, the bridge device or controller storytelling device at a first physical location detects a user interaction with a depiction of a remotely-located storytelling device. At time 1410, and based on the detected user interaction, the bridge device or controller storytelling device begins performing an animation sequence 1282 for the depiction using a local display device. At time 1415, the bridge device or controller storytelling device generates and transmits an instruction for the remotely-located storytelling device (corresponding to the local depiction) to perform a predetermined action 1284 corresponding to the animation sequence 1282. Alternately, the actions at times 1410, 1415 can occur in a reverse order and/or may occur at least partly overlapping in time. In order to make the environment more responsive to user input (and thereby increase the immersive nature), the animation sequence 1282 may begin substantially immediately (e.g., at time 1410) after registering the hit or other triggering event, even though the predetermined action 1284 begins at a later time.

The non-limiting example of action 1284 that is described here is receiving a final hit from a repulsor ray or other projectile, which causes the storytelling device to ultimately perform a mechanical toppling action. The action 1284 to be performed may include multiple stages 1430A, 1430B, and 1430C. As shown, stage 1430A includes motion and sound effects performed by the storytelling device, 1430B includes speech output from the storytelling device, and 1430C includes motion to include the toppling effect. Including multiple stages 1430 within a particular action 1284 can make the action 1284 appear more dramatic or theatrical to the users participating in the storytelling experience (i.e., similar to typical character actions depicted in movies), which enhances the immersive nature of the environment and increases user interest.

In some embodiments, the animation sequence 1282 that are performed locally may directly correspond to the remotely-performed actions 1284, such as including one or more of the same stages 1430 having the same relative timing. At time 1420, the bridge device at the remote physical location receives the generated instruction. Typically, time 1420 occurs later than time 1415, due to latency across the network connecting the bridge devices. The generated instruction may include timing information for coordinating the timing of the animation sequence 1282 with actions 1284, such as a timestamp indicating when the animation sequence 1282 began. After receiving the instruction at time 1420, the remote bridge device may perform additional processing before beginning performance of the action 1282 by the remote storytelling device at time 1425. Alternately, the remote bridge device may begin the action 1282 substantially immediately upon receiving the instruction at time 1420.

To achieve at least partial synchronization of the animation sequence 1282 with actions 1284, the remote bridge device may use timing information included with the instruction to begin the action 1284 at a point partway through the action 1284 (i.e., not from the beginning), such that an initial portion 1435 of the action 1284 is not performed in synchronization with the animation sequence 1282, but a subsequent portion 1440 is performed in synchronization. The remote bridge device may begin performance of the action 1284 partway through a stage 1430, or alternately at a transition point between stages 1430. While time 1425 indicates beginning the action 1284 partway through stage 1430A, the remote bridge device may alternately wait to begin the action until 1430B.

In some embodiments, the remote bridge device carries out the instructed action 1284 based on included timing information, without performing any substantial alteration to the timing. In other embodiments, the remote bridge device may determine when to begin the action 1284 based on the content of the action 1284. For example, say performing the received instruction according to the included timing information would cause the action 1284 to begin partway through stage 1430B (speech generation). However, generating only a portion of the prescribed speech of stage 1430B could cause the action to be unintelligible to the users and/or disrupt the users' perception of a continuous storytelling environment. Accordingly, the remote bridge device can adjust the timing of the performance of the action 1284 based on the type of action by, e.g., beginning performance at a subsequent stage 1430 of the action 1284, performing an alternate speech generation stage having a predetermined abbreviated speech corresponding to the content of stage 1430B (e.g., less wordy or paraphrased). Other types of actions may not have the same sensitivity to the timing of beginning the action 1284. For example, beginning the action 1284 partway through the stage 1430A (producing motion and sound effects instead of generated speech) may be perceived by a user as continuous, and the remote bridge device can perform the action without adjusting the timing specified by the instruction.

In some embodiments, the content of the initial portion 1435 may still be produced after beginning the action 1284 at time 1425. For example, playback of the entire stage 1430A can be accelerated such that all of the content of stage 1430A is produced between time 1425 and the beginning of the next stage 1430B. Subsequent stages 1430B, 1430C may resume a normal playback speed and may have full synchronization between the animation sequence 1282 and action 1284. In another example, one or more predetermined delays are included between stages 1430, and the predetermined delays are used to permit the animation sequence 1282 and/or action 1284 to "catch up" and resynchronize for subsequent stages 1430 of the action 1284. Thus, if a predetermined delay of suitable size is included between stages 1430A and 1430B, the remote bridge device can perform stage 1430A from its beginning at time 1425, completing stage 1430A within the predetermined delay period and resynchronizing with the animation sequence 1282 for subsequent stages 1430B, 1430C.

Next, timeline 1450 generally depicts delaying the performance of a first action 1284 and the performance of an animation sequence 1282, such that the action 1284 and animation sequence 1282 are synchronized substantially throughout the playback.

At time 1405, the bridge device or controller storytelling device at a first physical location detects a user interaction with a depiction of a remotely-located storytelling device. At time 1455 the bridge device begins a first predetermined delay 1460 before beginning the animation sequence 1282. At time 1415, the bridge device or controller storytelling device generates and transmits an instruction for the remotely-located storytelling device (corresponding to the local depiction) to perform a predetermined action 1284 corresponding to the animation sequence 1282.

At time 1420, the bridge device at the remote physical location receives the generated instruction. The instruction may specify a second predetermined delay 1470 before beginning the action 1284, or the remote bridge device may determine the second predetermined delay 1470 based on timing information included with the instruction. The second predetermined delay 1470 is generally smaller than the first predetermined delay 1460 and is at least partly dictated by a measure of latency 1276 between the local and remote bridge devices.

At time 1465, and upon completion of the second predetermined delay 1470, the remote bridge device begins performance of action 1284. At time 1465, the local bridge device also begins the animation sequence 1282, such that the entire action 1284 is played back substantially in synchronization with the animation sequence 1282.

Technical Description

Figure 15:
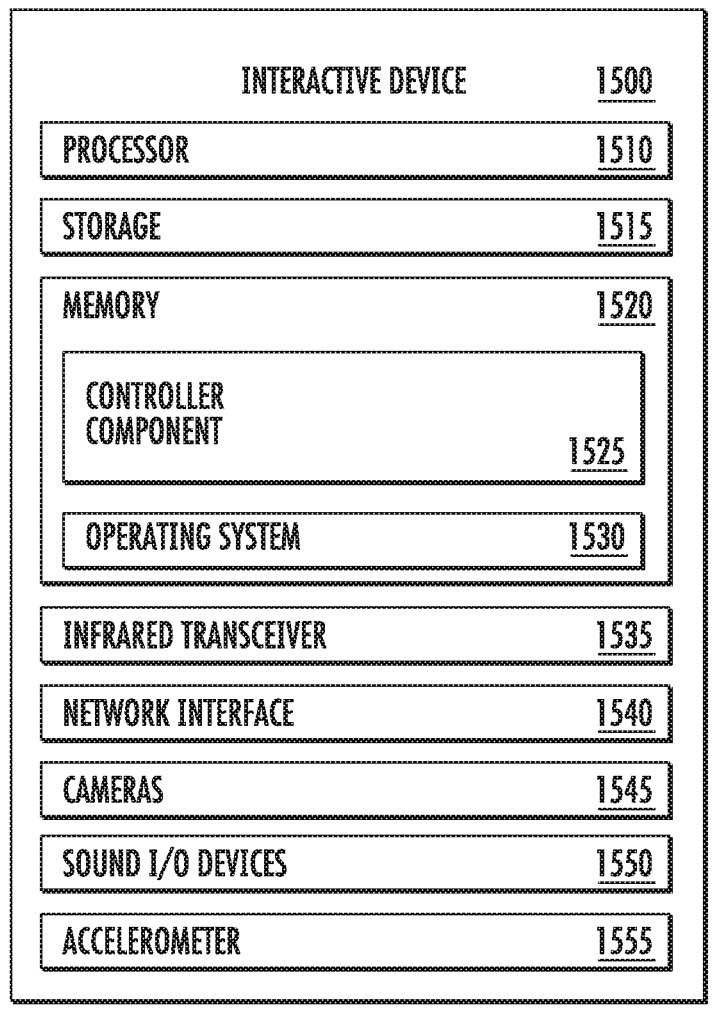
FIG. 15 is a block diagram illustrating an interactive device configured with a controller component, according to one embodiment described herein.

An example of an interactive storytelling device is shown in FIG. 15, which is a block diagram illustrating an interactive device configured with a controller component, according to one embodiment described herein. In this example, the device 1500 includes, without limitation, a processor 1510, storage 1515, memory 1520, an infrared transceiver 1535, a network interface 1540, camera devices 1545, sound I/O devices 1550 and an accelerometer device 1555. Generally, the processor 1510 retrieves and executes programming instructions stored in the memory 1520. Processor 1510 is included to be representative of a single CPU, multiple CPUs, a single CPU having multiple processing cores, GPUs having multiple execution paths, and the like. The memory 1520 is generally included to be representative of a random access memory. The network interface 1540 enables the controller component 1525 to connect to a data communications network (e.g., wired Ethernet connection or an 802.11 wireless network).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 15, the memory 1520 represents any memory sufficiently large to hold the necessary programs and data structures. Memory 1520 could be one or a combination of memory devices, including Random Access Memory, nonvolatile or backup memory (e.g., programmable or Flash memories, read-only memories, etc.). In addition, memory 1520 and storage 1515 may be considered to include memory physically located elsewhere; for example, on another computer communicatively coupled to the interactive device 150. Illustratively, the memory 1520 includes a controller component 1525 and an operating system 1530. The operating system 1530 generally controls the execution of application programs on the interactive device 1500. Examples of operating system 1530 include UNIX, a version of the Microsoft Windows® operating system, and distributions of the Linux® operating system. Additional examples of operating system 1530 include custom operating systems for gaming consoles, including the custom operating systems for systems such as the Nintendo DS® and Sony PSP®.

The infrared transceiver 1535 represents any device capable of sending and receiving infrared signals. In another embodiment, a device 1500 that only sends or receives infrared signals may be configured with an infrared transmitter or a infrared receiver, respectively, as opposed to the infrared transceiver 1535. The sound I/O devices 1550 could include devices such as microphones and speakers. For example, the speakers could be used to produce sound effects (e.g., explosion sound effects, dialogue, etc.) and/or to produce vibration effects.

Generally, the controller component 1525 provides logic for the interactive device 1500. For example, the controller component 1525 could be configured to detect that a coded infrared signal has been received (e.g., using the infrared transceiver 1535). The controller component 1525 could then determine a type of the infrared signal (e.g., based on data specified within the coded infrared signal) and could determine a corresponding response based on the determined type. For example, the controller component 1525 could determine that the infrared signal corresponds to a repulsor ray blast (e.g., from the Iron Man® action figure) and, in response, could increment a counter of received repulsor ray blasts. Additionally, the controller component

1525 could perform a corresponding action based on the counter. For example, if the controller component 1525 determines that the detected repulsor ray blast is the first blast received, the controller component 1525 could output a roaring sound effect (e.g., using a speaker 1550) and could manipulate a servomechanism on the device 1500 to produce a rocking effect (e.g., by rotating a lever mechanism positioned in the base of the device 1500 slightly). As another example, if the controller component 1525 determines that the repulsor ray blast was the fifth blast received, the controller component 1525 could output a groaning sound effect (e.g., using speaker 1550) and could manipulate the servomechanism such that the device 1500 falls over (e.g., by rotating a lever mechanism until the device 1500 falls over).

In the preceding, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional examples of storytelling devices and story management and creation techniques, as well as proximity detection techniques and communication protocols, are provided in the attached appendices.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a plurality of storytelling devices available to participate in a storytelling experience, the plurality of storytelling devices comprising a first storytelling device at a first physical location and a second storytelling device at a remote second physical location, each of the plurality of storytelling devices comprising an electronic device configured to perform at least one audiovisual effect; and
   during playback of a story comprising a plurality of predetermined actions mapped to the plurality of storytelling devices:
      receiving an instruction that configures the second storytelling device to perform a first action of the plurality of predetermined actions, wherein the instruction comprises timing information that indicates that an animation sequence is already in progress at the first physical location, wherein content of the animation sequence corresponds to a predetermined set of the predetermined actions to be performed by the second storytelling device in a plurality of stages, wherein the animation sequence begins responsive to a user interaction with a visual depiction of the second storytelling device, wherein the animation sequence comprises output of speech content; and
      performing, by the second storytelling device, the first action beginning at a time selected based on the timing information,
      wherein the time is selected such that the predetermined set of the predetermined actions will complete at the remote second physical location at a same time that the animation sequence will complete at the first physical location,
      wherein the first action comprises, during a first stage of the plurality of stages, output of alternate speech content using a speaker of the second storytelling device, wherein the alternate speech content is abbreviated from the speech content of the animation sequence, and
      wherein performing the predetermined set of the predetermined actions is, beginning with a second stage of the plurality of stages that follows the first stage, synchronized with performing the animation sequence at the first physical location.

2. The method of claim 1, wherein the instruction is generated by a bridge device at the first physical location that is communicatively coupled with the first storytelling device, wherein the timing information comprises a timestamp generated by the bridge device.

3. The method of claim 1, wherein the timing information comprises a first predetermined delay before performing the first action, the first predetermined delay corresponding to a second predetermined delay before performance of the animation sequence, such that an entirety of the first action and the animation sequence are performed substantially synchronized.

4. The method of claim 3, wherein the second predetermined delay is longer than the first predetermined delay based on a determined communication latency between a first bridge device at the first physical location and a second bridge device at the second physical location.

5. The method of claim 1, wherein the first action comprises an initial portion and a subsequent portion, and wherein the timing information indicates to begin performance of the first action at the subsequent portion, such that the first action and the animation sequence become substantially synchronized partway through performance of the animation sequence.

6. The method of claim 1, further comprising:
   determining a type of the first action; and
   selecting, based on the determined type, one of a predetermined delay before performing the first action and beginning performance partway through the first action.

7. The method of claim 1, wherein the plurality of predetermined actions comprises at least one of (i) outputting a sound effect using one or more speaker devices of one of the plurality of storytelling devices, (ii) controlling movement of one of the plurality of storytelling devices, and (iii) transmitting a signal using at least one signal transmitter device of one of the plurality of storytelling devices.

8. A non-transitory computer-readable medium comprising computer program code that, when executed by operation of one or more computer processors, performs an operation comprising:
   identifying a plurality of storytelling devices available to participate in a storytelling experience, the plurality of storytelling devices comprising a first storytelling device at a first physical location and a second storytelling device at a remote second physical location, each of the plurality of storytelling devices comprising an electronic device configured to perform at least one audiovisual effect; and
   during playback of a story comprising a plurality of predetermined actions mapped to the plurality of storytelling devices:
      receiving an instruction that configures the second storytelling device to perform a first action of the plurality of predetermined actions, wherein the instruction comprises timing information that indicates that an animation sequence is already in progress at the first physical location, wherein content of the animation sequence corresponds to a predetermined set of the predetermined actions to be performed by the second storytelling device in a plurality of stages, wherein the animation sequence begins responsive to a user interaction with a visual depiction of the second storytelling device, wherein the animation sequence comprises output of speech content; and performing, by the second storytelling device, the first action beginning at a time selected based on the timing information, wherein the time is selected such that the predetermined set of the predetermined actions will complete at the remote second physical location at a same time that the animation sequence will complete at the first physical location, wherein the first action comprises, during a first stage of a plurality of stages, output of alternate speech content using a speaker of the second storytelling device, wherein the alternate speech content is abbreviated from the speech content of the animation sequence, and wherein performing the predetermined set of the predetermined actions is, beginning with a second stage of the plurality of stages that follows the first stage, synchronized with performing the animation sequence at the first physical location.

9. The computer-readable medium of claim 8, wherein the instruction is generated by a bridge device at the first physical location that is communicatively coupled with the first storytelling device, wherein the timing information comprises a timestamp generated by the bridge device.

10. The computer-readable medium of claim 8, wherein the timing information comprises a first predetermined delay before performing the first action, the first predetermined delay corresponding to a second predetermined delay before performance of the animation sequence, such that an entirety of the first action and the animation sequence are performed substantially synchronized.

11. The computer-readable medium of claim 10, wherein the second predetermined delay is longer than the first predetermined delay based on a determined communication latency between a first bridge device at the first physical location and a second bridge device at the second physical location.

12. The computer-readable medium of claim 8, wherein the first action comprises an initial portion and a subsequent portion, and wherein the timing information indicates to begin performance of the first action at the subsequent portion, such that the first action and the animation sequence become substantially synchronized partway through performance of the animation sequence.

13. The computer-readable medium of claim 8, the operation further comprising:
    determining a type of the first action; and
    selecting, based on the determined type, one of a predetermined delay before performing the first action and beginning performance partway through the first action.

14. The computer-readable medium of claim 8, wherein the plurality of predetermined actions comprises at least one of (i) outputting a sound effect using one or more speaker devices of one of the plurality of storytelling devices, (ii) controlling movement of one of the plurality of storytelling devices, and (iii) transmitting a signal using at least one signal transmitter device of one of the plurality of storytelling devices.

15. A system, comprising:
    a first storytelling device at a first physical location;
    a second storytelling device at a remote second physical location; and
    control logic configured to perform an operation comprising:
        identifying a plurality of storytelling devices available to participate in a storytelling experience, the plurality of storytelling devices comprising the first storytelling device and the second storytelling device, each of the plurality of storytelling devices comprising an electronic device configured to perform at least one audiovisual effect; and
        during playback of a story comprising a plurality of predetermined actions mapped to the plurality of storytelling devices:
            receiving an instruction that configures the second storytelling device to perform a first action of the plurality of predetermined actions, wherein the instruction comprises timing information that indicates that an animation sequence is already in progress at the first physical location, wherein content of the animation sequence corresponds to a predetermined set of the predetermined actions to be performed by the second storytelling device in a plurality of stages, wherein the animation sequence begins responsive to a user interaction with a visual depiction of the second storytelling device, wherein the animation sequence comprises output of speech content; and
            performing, by the second storytelling device, the first action beginning at a time selected based on the timing information,
            wherein the time is selected such that the predetermined set of the predetermined actions will complete at the remote second physical location at a same time that the animation sequence will complete at the first physical location,
            wherein the first action comprises, during a first stage of a plurality of stages, output of alternate speech content using a speaker of the second storytelling device, wherein the alternate speech content is abbreviated from the speech content of the animation sequence, and
            wherein performing the predetermined set of the predetermined actions is, beginning with a second stage of the plurality of stages that follows the first stage, synchronized with performing the animation sequence at the first physical location.

16. The system of claim 15, wherein the instruction is generated by a bridge device at the first physical location that is communicatively coupled with the first storytelling device, wherein the timing information comprises a timestamp generated by the bridge device.

17. The system of claim 15, wherein the timing information comprises a first predetermined delay before performing the first action, the first predetermined delay corresponding to a second predetermined delay before performance of the animation sequence, such that an entirety of the first action and the animation sequence are performed substantially synchronized.

18. The system of claim 17, wherein the second predetermined delay is longer than the first predetermined delay based on a determined communication latency between a first bridge device at the first physical location and a second bridge device at the second physical location.

19. The system of claim 15, wherein the first action comprises an initial portion and a subsequent portion, and wherein the timing information indicates to begin performance of the first action at the subsequent portion, such that the first action and the animation sequence become substantially synchronized partway through performance of the animation sequence.

20. The system of claim 15, the operation further comprising:
   determining a type of the first action; and
   selecting, based on the determined type, one of a predetermined delay before performing the first action and beginning performance partway through the first action.

* * * * *